(12) United States Patent
Yoon et al.

(10) Patent No.: US 10,613,655 B2
(45) Date of Patent: Apr. 7, 2020

(54) ROLLABLE MOBILE TERMINAL AND CONTROL METHOD THEREFOR

(71) Applicant: LG ELECTRONICS INC., Seoul (KR)

(72) Inventors: Sunghye Yoon, Seoul (KR); Sujin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/060,631

(22) PCT Filed: Dec. 10, 2015

(86) PCT No.: PCT/KR2015/013515
§ 371 (c)(1),
(2) Date: Jun. 8, 2018

(87) PCT Pub. No.: WO2017/099276
PCT Pub. Date: Jun. 15, 2017

(65) Prior Publication Data
US 2019/0012008 A1    Jan. 10, 2019

(51) Int. Cl.
*G06F 3/041* (2006.01)
*H04M 1/725* (2006.01)
(Continued)

(52) U.S. Cl.
CPC .......... *G06F 3/041* (2013.01); *G06F 1/1615* (2013.01); *G06F 1/1643* (2013.01); *G06F 1/1652* (2013.01); *G06F 1/1692* (2013.01); *G06F 3/0481* (2013.01); *G06F 3/0488* (2013.01); *G06F 3/04886* (2013.01); *H04M 1/0208* (2013.01); *H04M 1/0241* (2013.01); *H04M 1/0268* (2013.01); *H04M 1/725* (2013.01);
(Continued)

(58) Field of Classification Search
CPC combination set(s) only.
See application file for complete search history.

(56) References Cited

U.S. PATENT DOCUMENTS

2010/0033435 A1    2/2010    Huitema
2012/0242599 A1*   9/2012    Seo ................. G06F 1/1641
                                                          345/173

(Continued)

FOREIGN PATENT DOCUMENTS

JP    2008-283350 A     11/2008
KR    10-2014-0025231 A  3/2014
KR    10-2014-0071118 A  6/2014

*Primary Examiner* — Deeprose Subedi
(74) *Attorney, Agent, or Firm* — Birch, Stewart, Kolasch & Birch, LLP

(57) ABSTRACT

The present invention relates to a rollable mobile terminal having a rollable touch screen and a control method therefor. The rollable mobile terminal comprises: a touch screen formed to be rollable; a first body connected to one end of the touch screen and configured to receive the touch screen therein while winding the same; a second body connected to an opposite end of the touch screen; and a control unit that sets at least one area of the touch screen exposed from the first body to the outside as a display area and outputs, on the display area, multiple virtual home buttons corresponding to multiple windows including different screen information when the multiple windows are output on the display area.

19 Claims, 28 Drawing Sheets

(51) Int. Cl.
    *G06F 3/0488*  (2013.01)
    *G06F 1/16*    (2006.01)
    *G06F 3/0481*  (2013.01)
    *H04M 1/02*    (2006.01)

(52) U.S. Cl.
    CPC .......... *G06F 2203/04102* (2013.01); *G06F 2203/04103* (2013.01); *G06F 2203/04803* (2013.01); *H04M 2250/22* (2013.01)

(56) References Cited

U.S. PATENT DOCUMENTS

2012/0242610 A1   9/2012  Yasumatsu
2016/0120023 A1*  4/2016  Choi .................. H05K 1/028
                                                         361/749

\* cited by examiner

ROLLABLE MOBILE TERMINAL AND CONTROL METHOD THEREFOR

CROSS REFERENCE TO RELATED APPLICATIONS

This application is the National Phase of PCT International Application No. PCT/KR2015/013515, filed on Dec. 10, 2015, all of which are hereby expressly incorporated by reference into the present application.

BACKGROUND OF THE INVENTION

1. Field of the Invention

The present disclosure relates to a rollable mobile terminal having a rollable touch screen and a control method thereof.

2. Description of the Related Art

Terminals may be divided into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

The mobile terminal includes a home button, and displayed with a preset home screen page when the home button is pressed. More specifically, when an application installed in the mobile terminal is executed, the execution screen is displayed, and when the home button is pressed while the execution screen is being displayed, the home screen page is displayed instead of the execution screen.

The home button is provided not only in hardware but also implemented as a software virtual home button.

Meanwhile, a display region of the mobile terminal in the related art is to fixed to always have a fixed size. There is a problem that the mobile terminal having a fixed size is inconvenient to carry. In order to solve this inconvenience, along with the recent development of display related technologies, flexible display devices having flexibility or rollable display devices that can be bent and rolled have been researched and developed.

A user may adjust a display region to be used according to his or her preference using the characteristics of a rollable display. In other words, the user may select at least one region in which screen information is to be displayed on the entire region of the rollable display.

The existing home button is configured to control a single screen displayed in the display region, but since a region in which screen information is displayed is varied by the user, a function change of the home button in consideration of the characteristics of the rollable display is required.

SUMMARY OF THE INVENTION

The objective of the present disclosure is to solve the above-mentioned problems and other problems.

An object of the present disclosure is to provide a rollable mobile terminal provided with a home button in consideration of the characteristics of a rollable display to implement a new user interface using the home button, and a control method thereof.

In order to accomplish the foregoing objectives, a rollable mobile terminal according to an embodiment of the present disclosure may include a touch screen formed to be rollable, a first body connected to one end of the touch screen to wind and accommodate the touch screen, a second body connected to the other end of the touch screen, and a controller configured to set at least one region of the entire region of the touch screen that is exposed outside the first body as a display region, and display a plurality of virtual home buttons corresponding to a plurality of windows in the display region when the plurality of windows comprising different screen information are displayed in the display region.

According to an embodiment, when the plurality of windows comprises first and second windows, the controller may display a first virtual home button corresponding to the first window and a second virtual home button corresponding to the second window in the display region.

According to an embodiment, the controller may sense a control command related to information displayed on the first window using a touch input applied to the first virtual home button, and sense a control command related to information displayed on the second window using a touch input applied to the second virtual home button.

According to an embodiment, when a preset first type of touch input is applied to the first virtual home button while an execution screen of a first application is displayed on the first window and an execution screen of a second application is displayed on the second window, the controller may display a home screen page on the first window instead of the execution screen of the first application.

According to an embodiment, when the preset first type of touch input is applied to the second virtual home button, the controller may display a home screen page on the second window instead of the execution screen of the second application.

According to an embodiment, when a home screen page includes a plurality of pages, a home screen page displayed on the first window may be a first page among the plurality of pages, and a home screen page displayed on the second window may be a second page among the plurality of pages.

According to an embodiment, the first and second virtual home buttons may be sequentially displayed along a longitudinal direction of the second body in a region adjacent to the second body in the display region.

According to an embodiment, when a drag input is applied to either one of the first and second virtual home buttons, a window corresponding to the either one may be processed differently according to a point from which the drag input is released.

According to an embodiment, when the display positions of the first and second virtual home buttons may be changed by the drag input, the display positions of the first and second windows may be changed with each other.

According to an embodiment, when the drag input is released from an edge of the touch screen, the controller may control the touch screen to allow the either one and a window corresponding to the either one to disappear.

According to an embodiment, when an execution screen of a first application is displayed on the first window and an execution screen of a second application is displayed on the second window, information related to the first application may be displayed on the first virtual home button, and information related to the second application may be displayed on the second virtual home button.

According to an embodiment, when the display region is extended by an external force while the first and second windows are displayed, the controller may display the first and second windows, and a third window, and display the first and second virtual home buttons, and a third virtual home button corresponding to the third window in the extended display region.

According to an embodiment, when the display region is smaller than a reference size due to an external force while the first and second windows are displayed, the controller may control the touch screen to allow either one of the first and second windows and a virtual home button corresponding to the either one to disappear from the display region.

According to an embodiment, the first window may be displayed adjacent to the first body in the display region, and the second window may be displayed adjacent to the second body in the display region, and the controller may control the touch screen to allow the second window and the second virtual home button to disappear from the display region when the display region is smaller than the reference size due to a movement of the second body while the first body is fixed, and control the touch screen the touch screen to allow the first window and the first virtual home button to disappear from the display region when the display region is smaller than the reference size due to a movement of the first body while the second body is fixed.

According to an embodiment, the rollable mobile terminal may further include a sensing unit configured to sense at least one region of the entire region of the touch screen that is exposed outside the first body unit, wherein the controller sets the sensed at least one region as the display region.

In addition, a rollable mobile terminal according to an embodiment of the present disclosure may include a touch screen formed to be rollable, a first body connected to one end of the touch screen to wind and accommodate the touch screen, a second body connected to the other end of the touch screen, and a controller configured to set at least one region of the entire region of the touch screen that is exposed outside the first body as a display region, and control the touch screen to display an execution screen of a first application in the display region, wherein when an event occurs in a second application while displaying an execution screen of the first application, the controller displays guide information for notifying the event on the display region, and when the display region is extended by an external force while displaying the guide information, the controller displays an execution screen of the first application in a first region of the extended display region, and displays an execution screen of the second application in a second region of the extended display region, and displays a first virtual home button for the execution screen of the first application and a second virtual home button for the execution screen of the second application in the extended display region.

According to an embodiment, when a new window open function is executed for a link included in the execution screen of the second application, the controller may control the touch screen to display information linked to the link in the second region, and display the execution screen of the second application in the first region, and allow the execution screen of the first application to disappear from the display region.

According to an embodiment, the first virtual home button, the second virtual home button, and a third virtual home button for information linked to the link may be displayed on the display region when the new window open function is executed.

According to an embodiment, the first virtual home button may be displayed to be distinguished from the second and third virtual home buttons to guide that the execution screen of the first application is not displayed in the display region.

According to an embodiment, when a drag-and-drop input to any one of the first through third virtual home buttons is sensed, the controller may control the touch screen to display any one of an execution screen of the first application, an execution screen of the second application, and information linked to the link in the first region, and to display another one in the second region, and not to display the remaining one on the display region based on the drag-and-drop input, and a virtual home button corresponding to the remaining one may be displayed to be distinguished from other virtual home buttons to guide that the remaining one is not displayed in the display region.

The effects of a rollable mobile terminal according to the present disclosure and a control method thereof will be described as follows.

According to the present disclosure, one or more windows are displayed according to a size of the display region. When a plurality of windows are displayed, user needs to control the windows individually may occur. A virtual home button corresponding to each of the windows may be displayed in a rollable mobile terminal according to the present disclosure, and thus a user may control the plurality of windows in an individual or independent manner using a plurality of virtual home buttons.

Effects and advantages to be achieved in the present disclosure will not be limited to the foregoing effects, and other effects, features and advantages which are not mentioned will become apparent from the following description by a person skilled in the art to which the present disclosure belongs.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
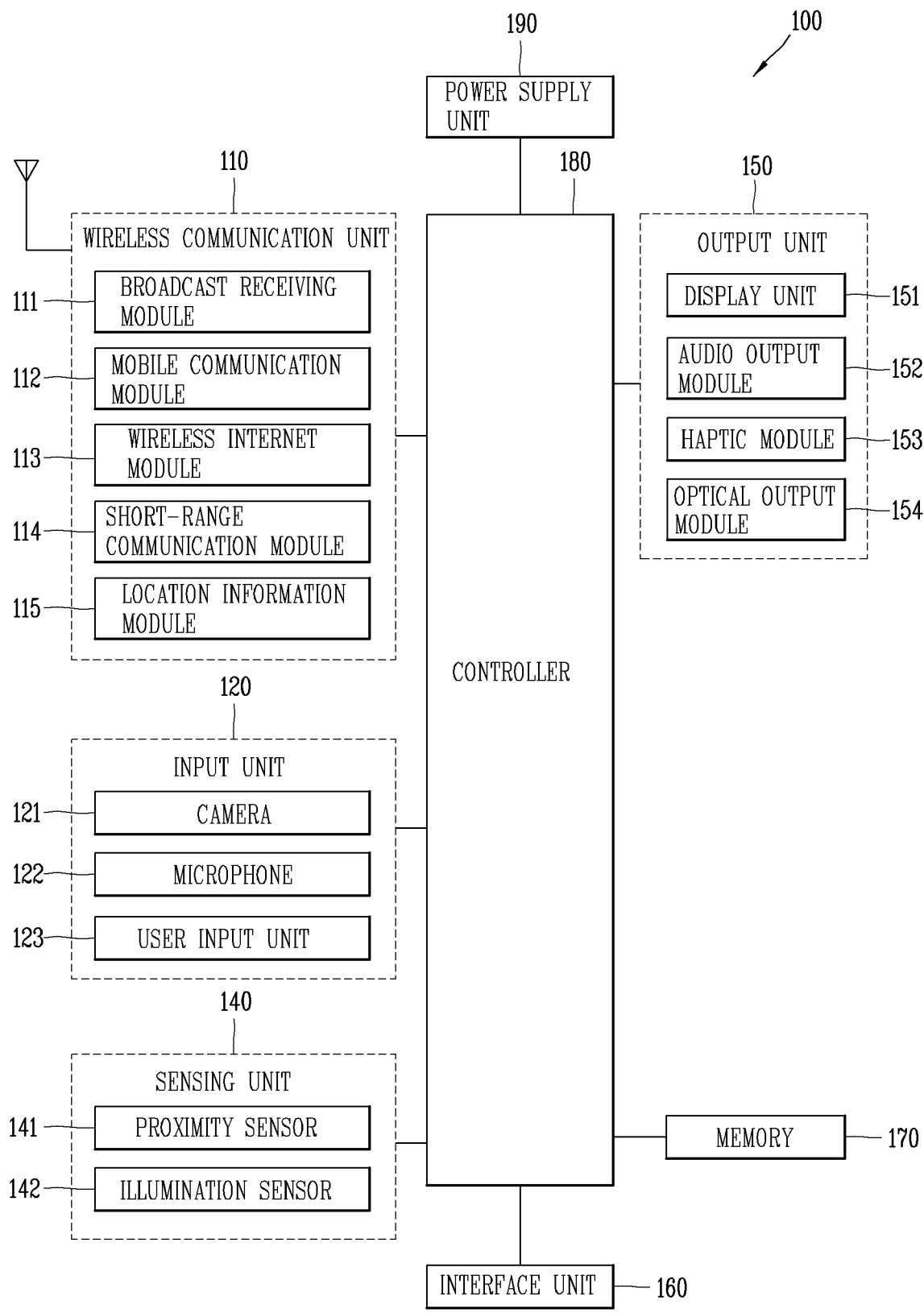
FIG. 1A is a block diagram for explaining a mobile terminal associated with the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
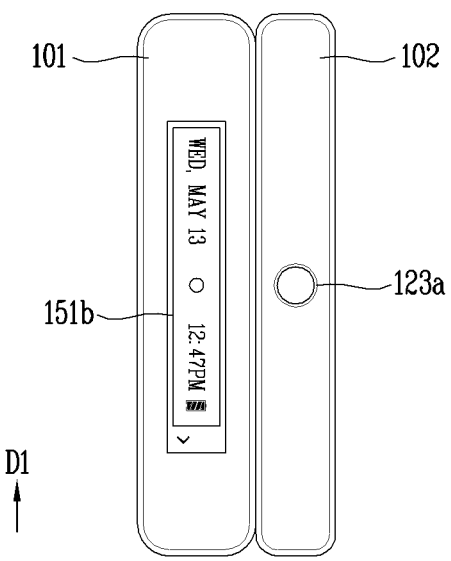
FIGS. 1B, 1C and 1D are conceptual views illustrating a rollable mobile terminal according to an embodiment of the present disclosure.
Figure 1C:
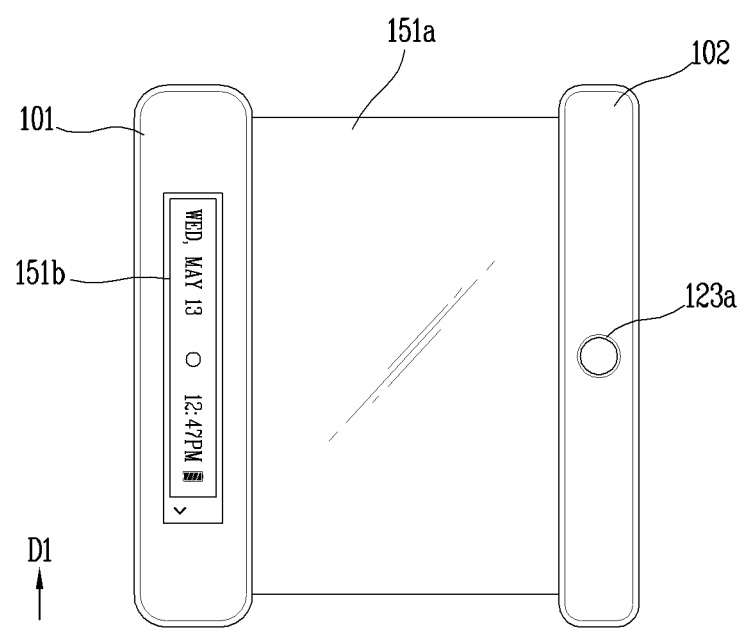

Referring to FIGS. 1A through 1C, FIG. 1A is a block diagram for explaining a mobile terminal associated with the present disclosure, and FIGS. 1B and 1C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to link data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or to infrared rays without a mechanical contact. The proximity sensor 141 may be arranged at an inner region of the mobile terminal covered by the touch screen, or near the touch screen.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or a stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

Meanwhile, the camera 121 constructing the input unit 120 may be a type of camera sensor. The camera sensor may include at least one of a photo sensor (or image sensor) and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors.

The signal output may be ended as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

Meanwhile, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the electronic device 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Furthermore, the display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images acquired by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may link with the display unit 151 to extend the function of the mobile terminal 100. Another example of the accessory may be a touch pen for assisting or extending a touch input onto a touch screen.

The foregoing display unit 151 may be deformable by an external force. The deformation may be at least one of curving, bending, folding, twisting and rolling of the display unit 151. The deformable display unit 151 may be referred to as a "flexible display unit" Here, the flexible display unit 151 may include both a general flexible display and an e-paper.

The general flexible display denotes a light, non-fragile display, which still exhibits characteristics of the conventional flat panel display and is fabricated on a flexible substrate which can be curved, bent, folded, twisted or rolled.

Furthermore, the e-paper is a display technology employing the characteristic of a general ink, and is different from the conventional flat panel display in view of using reflected light. The e-paper may change information by using a twist ball or an electrophoresis using a capsule.

A display region of the flexible display unit becomes a plane in a configuration that the flexible display unit is not deformed (for example, a configuration having an infinite radius of curvature, hereinafter, referred to as a "first configuration"). In a configuration in which the display unit is deformed from the first configuration by an external force (for example, a configuration with a finite radius of curvature, hereinafter, referred to as a second configuration), the display region may become a curved surface. As illustrated, information displayed in the second configuration may be visual information output on the curved surface. The visual information may be realized in such a manner that a light emission of each unit pixel (sub-pixel) arranged in a matrix configuration is controlled independently. The unit pixel denotes an elementary unit for representing one color.

At least part of the flexible display unit may be placed in a curved state (for example, a state of being curved from up to down or from right to left), other than a flat state, in the first configuration. In this case, when an external force is applied to the flexible display unit, the flexible display unit may be deformed back into a flat state (or less curved state) or into a more curved state.

On the other hand, the flexible display unit may implement a flexible touch screen using a touch sensor in combination with a touch sensor. When a touch is input onto the flexible touch screen, the controller 180 (see FIG. 1A) may execute a control corresponding to the touch input. The flexible touch screen may be configured to sense a touch input even in the second configuration as well as in the first configuration.

On the other hand, the mobile terminal 100 according to the modified example may include a deformation sensor which senses the deformation of the flexible display unit. The deformation sensor may be included in the sensing unit 140 (see FIG. 1A).

The deformation sensor may be provided in the flexible display unit or the case to sense information related to the deformation of the flexible display unit. Here, the information related to the deformation of the flexible display unit may be a deformed direction, a deformed degree, a deformed position, a deformed time, an acceleration that the deformed flexible display unit is restored, and the like. In addition to those, such information may be various information which is sensible in response to curving of the flexible display unit.

In case where the flexible display unit is wound and accommodated into a terminal, the deformation sensing unit may sense at least one region exposed from the terminal on the entire region of the flexible display unit.

Furthermore, the controller 180 may change information displayed on the flexible display unit or generate a control signal for controlling a function of the mobile terminal 100, based on the information related to the deformation of the flexible display unit sensed by the deformation sensor.

On the other hand, the mobile terminal 100 according to the modified example may include a case for accommodating the flexible display unit. The case may be configured to be deformable along with the flexible display unit 151 by an external force in consideration of the characteristics of the flexible display unit.

Moreover, a battery (not shown) provided in the mobile terminal 200 may be also configured to be deformed along with the flexible display unit by an external force in consideration of the characteristics of the flexible display unit. A stack and folding method for stacking up battery cells may be applicable to implement the battery.

The configuration deformation of the display unit may not be necessarily limited to an external force. For example, when the flexible display unit is in a first configuration, it may be deformed to a second configuration by a command of a user or application.

A rollable display unit is housed into a mobile terminal according to the present disclosure in a rolled state. The user may apply an external force to the mobile terminal to expose or store the display unit.

Figure 1D:
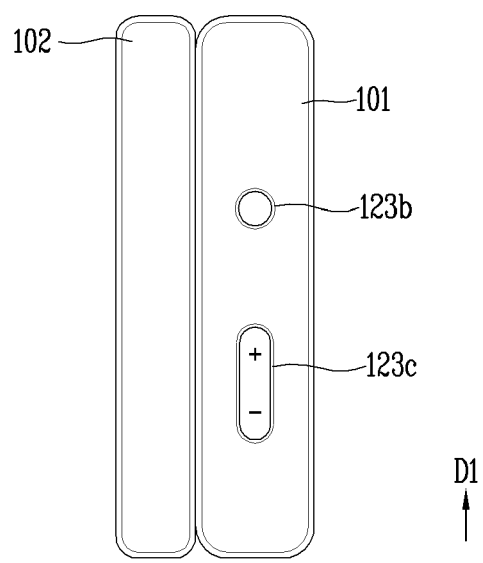

FIGS. 1B, 1C and 1D are conceptual views illustrating a rollable mobile terminal according to an embodiment of the present disclosure.

FIG. 1B is a front view illustrating the mobile terminal in a closed state in which the first touch screen 151*a* is housed in a body unit, and FIG. 1C is a front view illustrating the mobile terminal in an open state in which the first touch screen 151*a* is exposed from the body unit, and FIG. 1D is a rear view in the closed state.

Referring to FIGS. 1B and 1C, the mobile terminal 100 according to the present disclosure may include first and second body units 101, 102, first and second touch screens 151*a*, 151*b*, a first user input unit 123*a*.

The mobile terminal 100 of the present disclosure includes the first and second body units 101, 102. The first and second body units 101, 102 are extended in a first direction (D1), and spaced apart from each other based on a tension applied in a direction intersecting the first direction (D1).

One surface of the first body unit 101 and one surface of the second body unit 102 may be configured to be brought into contact with each other in a closed state. The first and second body units 101, 102 may extend along the first direction (D1) such that the lengths thereof are substantially the same. For example, a shape of the one surface of the first body unit 101 may correspond to that of one surface of the second body unit 102.

As shown in FIG. 1B, in the closed state, the first touch screen 151*a* may be housed in at least one of the first and second body units 101, 102 not to be exposed. This is to prevent the first touch screen 151*a* from being damaged by the external environment.

Moreover, the user may freely adjust a size of the terminal according to the use environment using a rollable characteristic. The first touch screen 151*a* may be housed to reduce the size of the terminal to facilitate portability or the entire region of the first touch screen 151*a* may be exposed to use a large screen display.

Hereinafter, for the sake of convenience of explanation, in the closed state, an embodiment in which the first touch screen 151*a* is housed in at least one of the first and second body units 101, 102 in a non-exposed state will be described, but the present disclosure is not limited thereto. For another example, in the closed state, a predetermined region of the first touch screen 151*a* may be exposed without being housed in the first and second body units 101, 102. In this case, the user may check information related to an event occurring in the mobile terminal even in the closed state through the predetermined region.

The first body unit 101 and/or the second body unit 102 of the mobile terminal 100 include a guide unit for guiding the first touch screen 151*a* to be rolled and housed. When the guide unit is provided in the first body unit 101, the guide unit extends along the first direction (D1), and the guide unit includes a housing space for housing a stylus pen (not shown).

The mobile terminal 100 may further include a stylus pen housed in the first body 101. The stylus pen may be extended along the first direction (D1) and housed in the first body unit 101 along the first direction (D1). The stylus pen is formed to be detachable from the first body unit 101 based on an external force of the user.

An end portion of the stylus pen may be exposed to an outside of the first body portion 101 in a state that the end portion of the stylus pen is housed in the guide unit. The user can apply a force to the stylus pen exposed from the first body unit 101 to separate the stylus pen from the first body unit 101.

One end portion of the first touch screen 151*a* is fixed to the first body unit 101 to be rolled by the guide unit, and the other end portion of the first touch screen 151*a* is fixed to the second body unit. When a distance between the first and second body units 101, 102 is shortened, the first touch screen 151*a* is gradually moved to an inside of the first body portion 101 while being rolled by the guide module.

The first and second body units 101, 102 are spaced apart from each other based on a tension applied in a direction intersecting the first direction (D1), and the first touch screen 151*a* is exposed between the first and second body units 101, 102. As a distance between the first and second body units 101, 102 increases due to the external force, an area of the exposed first touch screen 151*a* increases.

The first body unit 101 may include a light-transmitting portion (not shown) made of a transparent material to expose a partial region of the first touch screen 151*a*. An image displayed in one region of the first touch screen 151*a* housed in the first body unit 101 may be checked by the light-transmitting portion.

The first touch screen 151*a* may be formed integrally with a touch sensor unit for receiving a user's touch input. Accordingly, a touch sensor included in the first touch screen 151*a* may sense a touch input applied through the light transmitting portion. An independent touch sensor may be included on the light-transmitting portion.

The first touch screen 151*a* may be formed integrally with a touch sensor unit for receiving a user's touch input. Accordingly, a touch sensor included in the first touch screen 151*a* may sense a touch input applied through the light transmitting portion. For example, in the closed state, the controller may control one region of the first touch screen 151*a* corresponding to the light-transmitting portion to display the current status information (current time, current position, current date, etc.), event information being received, and the like in the closed state. At this time, the remaining region except one region of the first touch screen 151*a* corresponding to the light-transmitting portion may maintain an off state in the closed state. As a result, it may be possible to prevent power from being unnecessarily wasted.

When the light-transmitting portion is provided therein, the user may visually check at least one region of the first touch screen 151*a* through the light-transmitting portion. On the other hand, as illustrated in FIG. 1B, a second touch screen 151*b* may be formed on the first body unit 101, instead of the light-transmitting portion.

The second touch screen 151*b* may include at least one of the status information of the mobile terminal 100 and an icon of a preset application. The status information of the mobile terminal 100 may include at least one of antenna information, communication mode information, battery information, occurred event information, information on a set function, time information, and weather information of the mobile terminal 100. The preset application may include at least one of an icon and a widget corresponding to a specific application preset by the user's selection or controller 180.

The second touch screen 151*b* may include at least one of a liquid crystal display (LCD), a thin film transistor-liquid crystal display (TFT-LCD), an organic light emitting diode (OLED), a flexible display, a 3-dimensional (3D) display, and an e-ink display.

In the closed state, the first touch screen 151*a* is housed in at least one of the first and second body units 101, 102, and the status information of the mobile terminal 100 may be displayed on the second touch screen 151*b*.

Referring to FIG. 1C, one end portion of the first touch screen 151*a* is fixed to the first body 101 and the other end portion of the first touch screen 151*a* is fixed to the second body unit 102. Accordingly, the user may grasp and pull the first and second body units 101, 102 by hand to expose the display unit, which is rolled and housed into at least one of the first and second body units 101, 102.

Hereinafter, at least one region that is exposed to an outside of the entire region of the first touch screen 151*a* to allow the user to check visual information is defined as a "display region," and a region excluding the display region as a "remaining region."

The controller 180 may sense at least one of the display region and the remaining region using the sensing unit 140 or the deformation sensing unit. On the basis of the sensing result, the controller 180 may control the first touch screen 151*a* to display screen information while the display region is turned on and maintain the remaining region in an off state.

The display region may display (output) information processed in the mobile terminal 100 in the open state. For example, the display region may display execution screen information of an application program driven in the mobile terminal 100 or user interface (UI) and graphic user interface (GUI) information in response to the execution screen information.

Meanwhile, the first and second touch screens 151*a*, 151*b* may include a touch sensor for sensing a touch to the touch screen to receive a control command by a touch method. When a touch is applied to the touch screen, the touch sensor may be configured to sense this touch and the controller 180 may generate a control command corresponding to the touch. The content which is input in the touching manner may be a text or numerical value, or a menu item which can be indicated or designated in various modes.

On the other hand, the touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

As described above, the display unit illustrated in FIG. 1A may form a touch screen together with the touch sensor, and in this, the touch screen may serve as the user input unit 123 (see FIG. 1A). In some cases, the touch screen may replace at least some of the functions of the user input unit.

Meanwhile, the second body unit 102 is provided with the first user input unit 123*a*. However, the present disclosure may not be limited thereto, and the position of the first input unit 123*a* may be changed.

A control command for the first touch screen 151*a* is received from the first user input unit 123*a*. More specifically, when a push input is applied to the first touch screen 151*a* in the open state, the first touch screen 151*a* is switched to an active state. In other words, the first user input unit 123*a* may be a home button for turning on or off the first touch screen 151*a*.

The first user input unit 123a includes a button disposed on a front side of the second body unit to receive a push input, and a fingerprint scanner disposed to overlap with the button and configured to recognize a fingerprint of a finger in contact therewith.

The button is exposed from the front side to an outside of the terminal, and configured to receive a push input of a first function. The first function may be a function of allowing preset display information to be displayed in the display region. For another example, when a user applies a push input to the button while a web page screen is displayed in the display region, the web page screen of the display region may be switched to a home screen page. For still another example, when a home screen page is displayed on the first touch screen 151a and the home screen page include a plurality of home screen pages, the home screen page may be switched by a push input applied to the button.

The first user input unit 123a may be formed to scan a fingerprint from the user's finger applying the push together with the push input being applied. More specifically, a fingerprint scanner module is mounted on one surface of the button (an upper surface in this example), thereby recognizing the fingerprint of a finger in contact with the button. The button is slidably formed by the push, thereby pushing the switch. When the switch is pressed, the controller senses a push input to process the corresponding control command.

However, the present disclosure is not necessarily limited to the above structure. For example, the push button may be replaced with a touch button. More specifically, the fingerprint scanner module may be disposed on an upper surface of the touch button. Therefore, in the example described below, a push input through the push button may be replaced with a touch input through the touch button.

The fingerprint scanner module may be used as a function key related to power on/off. For example, when the button of the first user input unit 123a is pushed while the power of the terminal is turned off, power is supplied to the fingerprint scanner module to perform fingerprint recognition. The terminal determines whether the recognized fingerprint corresponds to the users fingerprint, and proceeds to continue power-on and terminal booting if applicable. As described above, as a power-on command of the terminal is carried out in two steps (fingerprint scanner power-on and terminal power-on), the consumed current may be further reduced. In other words, a security function according to fingerprint recognition is given to the power-on operation, but the fingerprint scanner module may be turned off together with the terminal body instead of continuously being in an on state.

Moreover, in this case, since the user turns on the terminal, when the power-on and the terminal booting are completed, the display region may directly enter a home screen page without passing through a lock screen.

In addition, when the recognized fingerprint does not correspond to the user's fingerprint, the power-on and terminal booting will be interrupted. In this case, the terminal may display a warning message indicating that the fingerprint is not the user's fingerprint. The warning message may be, for example, carried out by providing a lighting effect to a front surface of the terminal for a predetermined period of time or outputting an effect sound.

For yet still another example, in a lock mode in which a lock screen is displayed in the display region, when a push input is applied to the first user input unit 123a, the lock screen is unlocked and switched to a home screen page. In this case, the first user input unit 123a may be a hot key for performing unlocking.

However, the unlocking is carried out only when the fingerprint scanner performs fingerprint recognition on an object in contact with the fingerprint scanner for pushing, and the recognized fingerprint corresponds to the prestored user's fingerprint. During the fingerprint recognition, a notification message indicating that fingerprint recognition is being performed may be displayed on the second touch screen 151b of the terminal to indicate it.

The first body unit 101 and the second body unit 102 may move in a direction away from each other or move in a direction toward each other by a user gesture due to the characteristics of the rollable mobile terminal.

For example, in the locked state, the first and second body units 101, 102 are spaced apart from each other based on a tension applied in a direction intersecting the first direction (D1), and the first touch screen 151a is exposed between the first and second body units 101, 102. The exposure of at least one region of the first touch screen 151a housed in the guide unit to an outside of the guide unit is defined as "roll-out." The closed state may be switched to the open state by the roll-out.

On the contrary, when the first body 101 and the second body unit 102 move in a direction toward each other, at least one region of the first touch screen 151a, which has been exposed out of the guide unit, is housed in the guide unit, which is defined as "roll-in." The open state may be switched to the closed state by the roll-in.

When the fingerprint scanner is switched from the closed state to the open state, the controller 180 determines whether or not to release the locked state based on the fingerprint scanner recognizing the fingerprint of a finger.

A lock screen formed to receive a password for unlocking while maintaining the locked state is displayed in the display region when the recognized fingerprint is not present or inconsistent with the prestored user's fingerprint. The password can be set in various forms such as a password or a pattern set by the user.

When the lock screen is displayed in the display region, guide information indicating that the locked state is maintained and fingerprint recognition is required may be displayed on the second touch screen 121b. In a state that the lock screen is displayed (or a lock mode), the first touch screen 151a may be in a state in which only a touch input related to an operation of releasing the locked state is allowed. The operation of releasing the locked state may be an operation of entering a pattern or a password set by the user.

On the contrary, when the recognized fingerprint corresponds to the user's fingerprint, the controller 180 switches the locked state to the unlocked state to display a home screen page in the display region. Guide information for notifying that the fingerprint recognition is successful may be displayed on the second touch screen 121b.

Here, the home screen page may also be referred to as an idle screen, in which a touch input to the display region is enabled. In this case, the first user input unit 123a may be a hot key for performing unlocking.

The home screen page may be displayed on the display unit 251 when the terminal is in an idle state. More specifically, an icon or a widget of an application installed in the mobile terminal may be displayed on the home screen page. Furthermore, the home screen page may be composed of a plurality of home screen pages depending on the user's selection or a number of applications installed in the terminal.

As described above, switching to a home screen page may be carried out in a form of returning to the home screen page while a specific application is being executed, rather than in the lock mode. For example, when the first user input unit 123*a* is pushed while a web page is displayed in the display region, the terminal returns to a home screen page. In other words, the first user input unit 123*a* may operate as a home key for performing a control command to return to the home screen page.

The display region that has been turned off by roll-out is turned on to display screen information, but the locked state is released or maintained depending on whether or not a fingerprint matching a prestored user fingerprint is recognized in the first user input unit 123*a*. As a result, the user may control the rollable terminal to display different screen information during roll-out.

Meanwhile, when unlocked in the open state, a plurality of icons related to the execution of different applications may be displayed on the second touch screen 151*b*. In other words, when the home screen page is displayed in the display region, the controller 180 may display a plurality of icons on the second touch screen 151*b*.

The plurality of icons may be associated with an application selected by a user or executed recently. When the plurality of icons are related to applications preset by the user, the type of a preset application may be reset by a user input.

When a touch is applied to any one of the plurality of graphic objects in the open state, the controller 180 executes an application corresponding to the any one of the plurality of graphic objects, and displays the execution screen in the display region. For example, when a touch is applied to any one of the icons displayed on the second touch screen 151*b* while a home screen page is displayed in the display region, the home screen page switched to an execution screen of an application corresponding to the any one icon.

When the execution screen is displayed in the display region, the icons disappear from the second touch screen 151*b*, and graphic objects corresponding to functions related to the application are displayed on the second touch screen.

As roll-out is performed in the closed state, the display region is changed from a vertically long rectangular shape to a horizontally long rectangular shape. When a user grasps the terminal using the first and second body units 101, 102, it is difficult for the user to apply a touch to a graphic object when the graphic object is displayed at the center of the display region. In order to prevent such an inconvenience, when the execution screen is displayed in the display region, the rollable mobile terminal according to the present disclosure may display at least one of graphic objects to be included in the execution screen on the second touch screen 151*b* instead of the display region (or in the display region and the second touch screen 151*b* in an overlapping manner). As a result, the user may execute a function related to an execution screen using his or her hand holding the terminal.

The second touch screen 151*b* may serve as an information provider for providing simple information in the locked state, and provide a preset icon to allow quick execution in the open state or provide an interface capable of controlling screen information being displayed in the display region.

According to the present disclosure, since the first and second touch screens 151*a*, 151*b* operate in conjunction with each other, the mobile terminal may effectively display information necessary for a user.

On the other hand, when the open state is switched to the locked state by roll-in in the unlocked state, the controller 180 locks the terminal. In other words, the terminal is switched to a locked state.

Referring to FIG. 1D, the second and third user input units 123*b*, 123*c* may be disposed on a rear surface of the mobile terminal. More specifically, the second and third user input units 123*b*, 123*c* may be disposed on a rear surface of the first body unit 101.

However, these configurations are not limited to this arrangement. These configurations may be excluded or placed on different sides as needed. For example, the second user input part 123*b* may be provided on a side surface of the first body unit 101 other than a rear side thereof, and the third user input part 123*c* may be provided a rear surface of the second body unit 102 other than on the first body unit 101.

The on/off of the terminal itself may be carried out by the second user input part 123*b*. For example, a function related to the activation of the second touch screen 151*b* in the power on/off state or in the closed state, a function related to the activation of the first and second touch screens 151*a*, 151*b* in the open state may be executed by a push input applied to the second user input unit 123*b*. In other words, the second user input unit 123*b* may serve as a power key of the terminal.

The third user input unit 123*c* may serve as a volume key. More specifically, the third user input part 123*c* is formed along a longitudinal direction of the first body unit 101 and exposed to an rear surface of the terminal body. The third user input unit 123*c* is configured to include keys arranged on the upper and lower sides, respectively, and receive a push input of a function related to a volume adjustment of sound output from the terminal body.

Although not shown in the drawings, the components described in FIG. 1A may be provided in any one of the front, side, rear, and inside of the terminal body. 1*o* For an example, a first camera may be disposed on a rear surface of the first body unit 101, and a second camera may be disposed on a rear surface of the second body unit 102.

The structure of the rollable mobile terminal has been mainly described above, but the control operation may be modified into various forms using such a structure.

A method of selectively displaying at least one screen information according to a degree of rolling in the rollable mobile terminal and controlling at least one screen information being displayed based on a user input applied to the first user input section 123*a* will be described in detail.

Figure 2A:
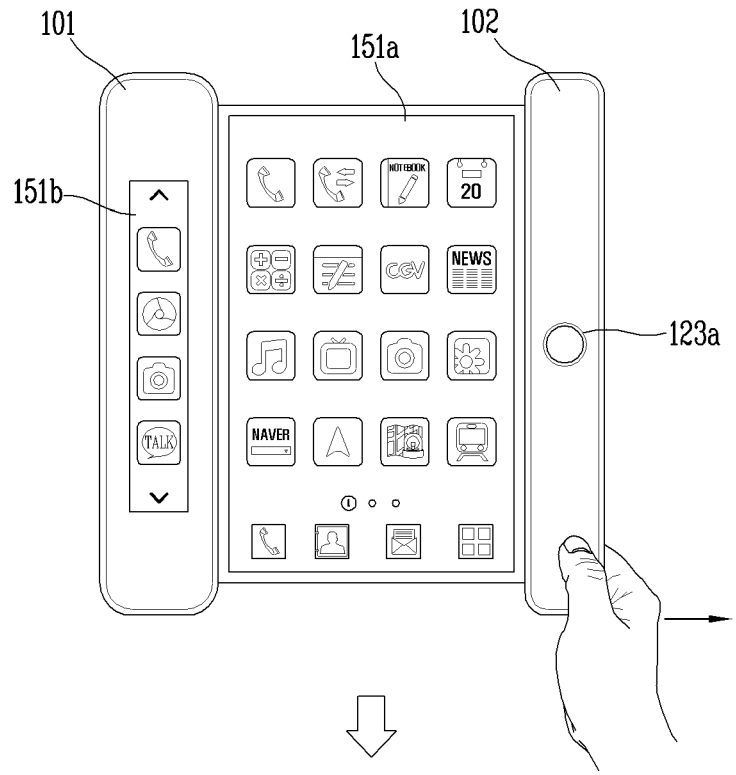
FIGS. 2A and 2B are conceptual views for explaining a rollable mobile terminal for outputting a plurality of screen information.
Figure 2A:
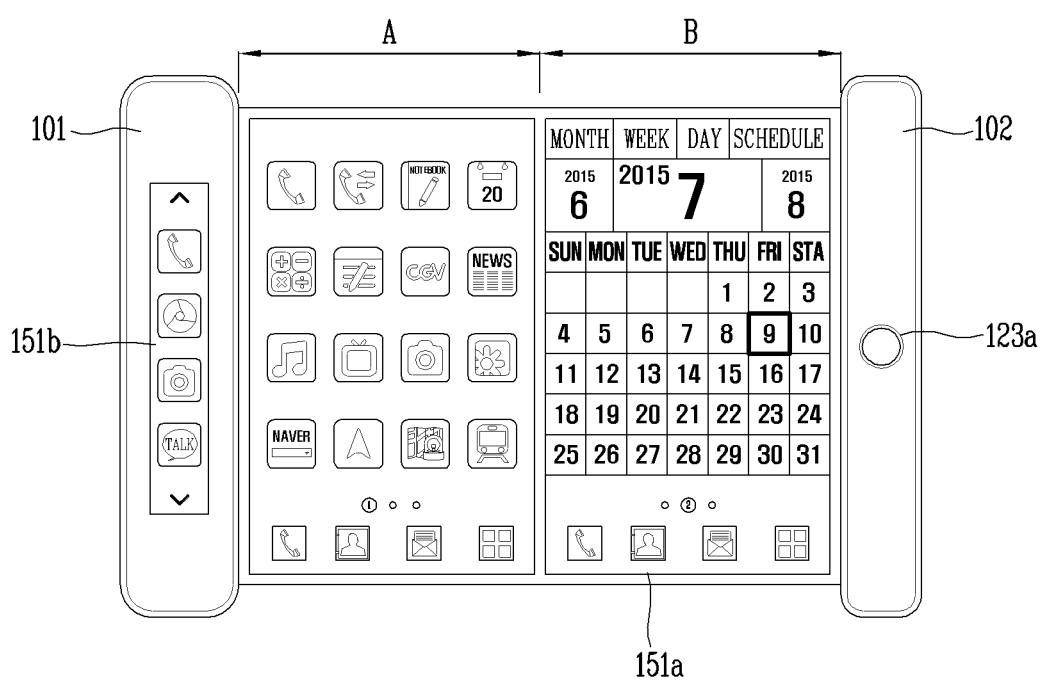
Figure 2B:
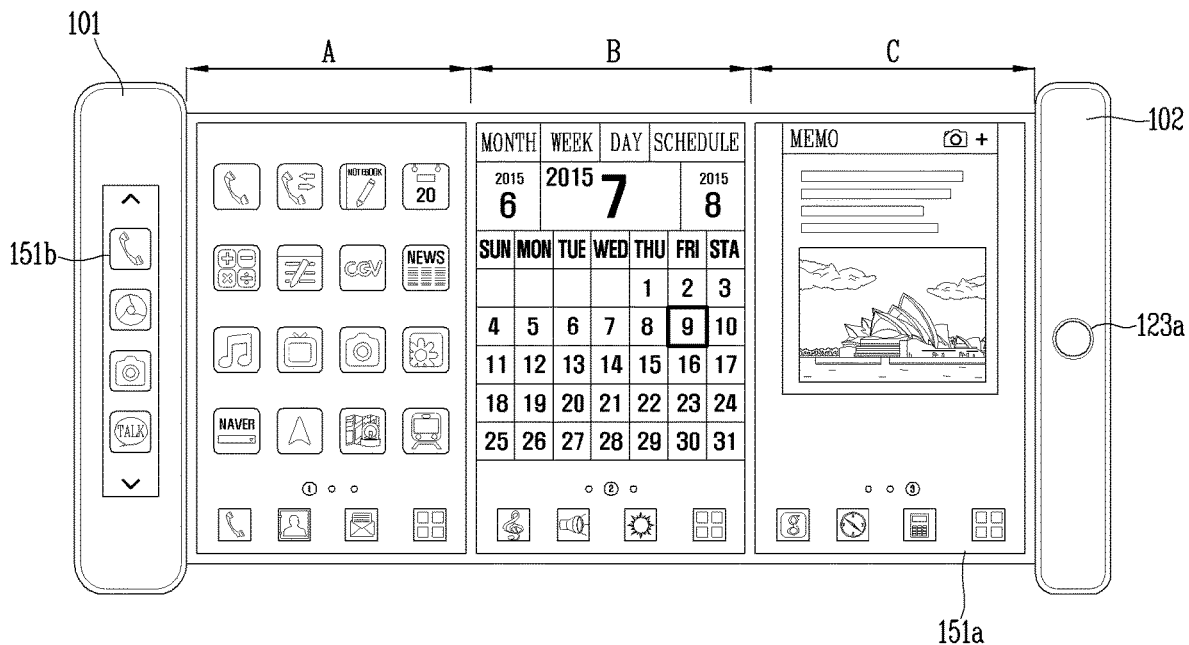

FIGS. 2A and 2B are conceptual views for explaining a rollable mobile terminal for outputting a plurality of screen information Referring to FIG. 2A, in the open state, a home screen page may be displayed in the display region, and preset icons may be displayed on the second touch screen 151*b*.

When the home screen page includes a plurality of pages, at least one of the plurality of pages is displayed in the display region. At this time, the controller determines a number of pages to be displayed in the display region based on a size of the display region. For example, when the display region is smaller than a reference size, a first page corresponding to any one of the plurality of pages is displayed, and when the display region is larger than or equal to the reference size, a first page and a second page among the plurality of pages may be displayed. In other words, when the display region is smaller than the reference size, one page is displayed, and when the display size is greater than or equal to the reference size, two or more pages may be displayed.

The display region is varied according to roll-in or roll-out, and the rollable mobile terminal 100 has a sensing unit 140 (see FIG. 1) 140 to measure at least one of the display region and the remaining region using the sensing unit 140. Then, a number of pages to be displayed in the display region is determined according to the measurement result.

For example, as shown in FIG. 2A, when the display region is larger than the reference size due to roll-out while one page is being displayed, two or more number of different pages may be displayed in the display region based on the size of the display region.

In this case, the controller 180 divides the display region into different regions based on the size of the display region, and displays different pages in the divided regions. For example, when the number of pages to be displayed is determined to be two, the display region is partitioned into first and second regions (A, B), and a first page is displayed in the first region (A) and a second page in the second region (B).

The first and second regions (A, B) may be used as windows that operate independently. Specifically, when a touch input is applied to the first region (A), screen information being displayed in the first region (A) is switched to other screen information, while screen information being displayed in the second region (B) is maintained.

Specifically, when the display region is larger than the reference size while the first window is displayed in the first region (A), the display region is divided into display regions. The display region having a size larger than the reference size is divided into the first and second regions (A, B), the first region (A) becomes a first window, the second region (B) becomes a second window.

A touch input applied to the first region (A) (or first window) generates a control command related to screen information displayed on the first window to change the screen information displayed on the first region (A) to other screen information. On the contrary, a touch input applied to the second region (B) (or second window) generates a control command related to screen information displayed on the second window to change the screen information displayed on the second region (B) to other screen information. In other words, a touch input applied to any one of a plurality of windows being displayed in the display region generates a control command for any one of the windows, but does not affect other windows.

Accordingly, an execution screen of a first application may be displayed among a plurality of applications executable in the terminal on the first region (A) (or first window), and an execution screen of a second application may be displayed among the plurality of applications on the second region (B) (or second window).

The term "window" may denote a region itself in which any one of a plurality of user interfaces operating independently in the entire region of the touch screen is displayed. For example, when the first user interface is displayed in the first region, the first region may be referred to as a first window, and when the second user interface is displayed in the second region, the second region may be referred to as a second window.

Referring to FIG. 2B, the controller 180 determines a number of windows to be displayed in the display region according to a size of the display region, and displays one or more windows according to the determined number of windows.

The size of the display region may be determined by a distance between the first body unit 101 and the second body unit 102. One end of the touch screen is connected to the first body unit 101 and the other end of the touch screen is connected to the second body unit 102, and thus a vertical length of the display region is fixed. Accordingly, the size of the display region is determined by a horizontal length of a portion exposed to the outside within an entire horizontal length of the touch screen.

The controller 180 may divide a display state of the display region into at least two or more states based on the horizontal length of the display region. For example, when it is determined as a first state when a horizontal length (W) of the display region is within a first range (0<W≤a), a second state when the horizontal length (W) of the display region is within a second range (0<W≤b), and a third state when the horizontal length (W) of the display region is within a third range (0<W≤max). However, the first to third states are merely examples, and the display state may be divided into at least two or more states according to the entire horizontal length of the touch screen.

The controller 180 displays a first window in the first state, displays first and second windows in the second state, and displays first through third windows in the third state.

For an example, the region where the first through third windows are displayed may be fixed in the entire region of the touch screen. For example, as illustrated in FIG. 2B, a first window is displayed in a portion (first region, or A) from 0 to a, a second window in a portion from a to b (second region, or B), a third window in a portion from b to c (third region, or C). If the width (W) of the display region is within the second range, the first window is displayed in a portion (A) from 0 to a, and the second window is displayed in a portion (at least a part of B) from a to W. In this case, the user may performing roll-out or roll-in while checking a boundary line between the windows, thereby appropriately adjusting the display region to be used.

For another example, a region in which the first through third windows are displayed may vary according to the display region. If the width (W) of the display region is within the second range, the controller 180 displays the first and second windows, and divides the display region into two equal portions, and displays the first and second windows in the equally divided different regions, respectively. Since the size of one or more windows varies according to the size of the display region, the user may be provided with an interface optimized for the display region.

On the other hand, when the home screen page is composed of a plurality of pages, different pages among the plurality of pages may be preset on windows displayed in the display region. For example, a first page may be preset in the first window, a second page may be preset in the second window, and a third page may be preset in the third window. When the home button is pressed, a preset page is displayed instead of screen information being displayed, and in this case, the preset first page is displayed on the first window and the preset second page is displayed on the second window.

Hereinafter, a method of providing a new type of user interface in consideration of the characteristics of the rollable display will be described with reference to FIGS. 3 through 11D. According to the following modified example or embodiment, the same or similar reference numerals are designated to the same or similar configurations to the foregoing example, and the description thereof will be substituted by the earlier description.

Figure 3:
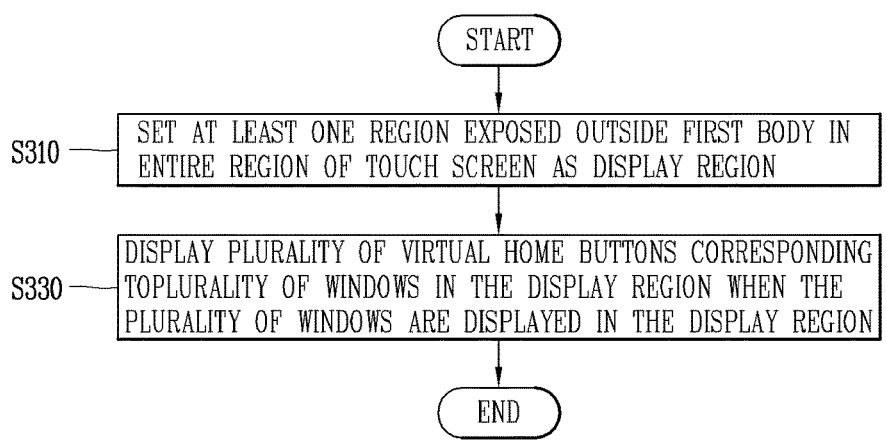
FIG. 3 is a flowchart for explaining a method of controlling a control method according to the present disclosure.

FIG. 3 is a flowchart for explaining a method of controlling a control method according to the present disclosure.

First, the controller sets at least one region exposed outside the first body within the entire region of the touch screen as a display region (S310).

The controller 180 senses at least one region exposed outside the first body using the sensing unit 140 (see FIG. 1A), and sets the sensed at least one region as the display region. The controller 180 may sense at least one of a width, a size, a position, and a screen ratio of the display region using the sensing unit 140.

Moreover, the controller 180 controls the touch screen 151a such that screen information is displayed in the sensed display region and the remaining region is turned off.

As roll-in/roll-out occurs, the display region is varies, and in this case, the controller 180 resets the display region. In other words, a region in which screen information is displayed is varied by roll-in/roll-out.

Next, when a plurality of windows are displayed in the display region, a plurality of virtual home buttons corresponding to the plurality of windows are displayed in the display region (S330).

When the preset condition is satisfied, the controller 180 may display a plurality of windows in the display region. For example, when the display region is larger than a reference size due to roll-out while displaying one window, the controller 180 may further display a new window in the display region. For another example, the controller 180 may further display a new window in the display region when there is a user request.

When a plurality of windows are displayed in the display region, a plurality of virtual home buttons corresponding to the plurality of windows are displayed in the display region (S330).

A virtual home button may be understood as a graphical object, an image, a button, or the like that embodies a conventional hardware home button (or home key) in a software manner. The virtual home button may be called a virtual home button, a virtual home key, or the like.

The virtual home button may be associated with at least one of a function for displaying a preset home screen page on a specific window, a function for changing the display position of the specific window, and a function for terminating the display of the specific window.

The controller 180 may execute the at least one function in accordance with a touch input to the virtual home button. For example, when first to third windows are displayed in the display region, the first to third virtual home buttons are displayed in the display region. At this time, when a preset type of touch input is applied to the second virtual home button, a function corresponding to the applied touch input is executed for the second window.

According to the present disclosure, one or more windows are displayed according to a size of the display region. When a plurality of windows are displayed, user needs to control the windows individually may occur. A virtual home button corresponding to each of the windows may be displayed in a rollable mobile terminal according to the present disclosure, and thus a user may control the plurality of windows in an individual or independent manner using a plurality of virtual home buttons.

A control method related to the present disclosure described above may be embodied in various forms as shown in FIGS. 4A through 11D. Hereinafter, according to the following modified example or embodiment, the same or similar reference numerals are designated to the same or similar configurations to the foregoing example, and the description thereof will be substituted by the earlier description.

FIGS. 4A through 4D are conceptual views for explaining a rollable mobile terminal for controlling information to be displayed as the display region is varied.

Figure 4A:
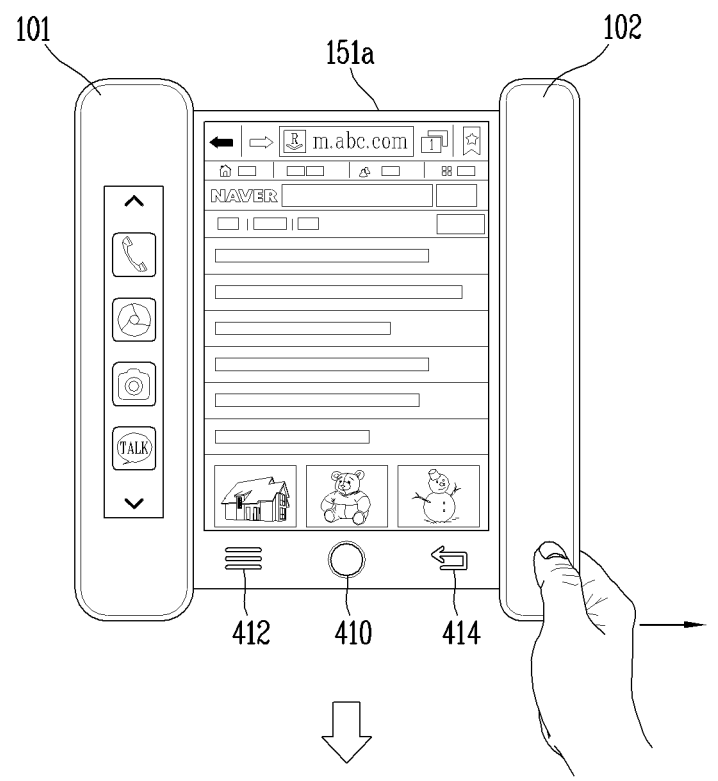
FIGS. 4A through 4D are conceptual views for explaining a rollable mobile terminal for controlling information to be displayed as the display region is varied.
Figure 4A:
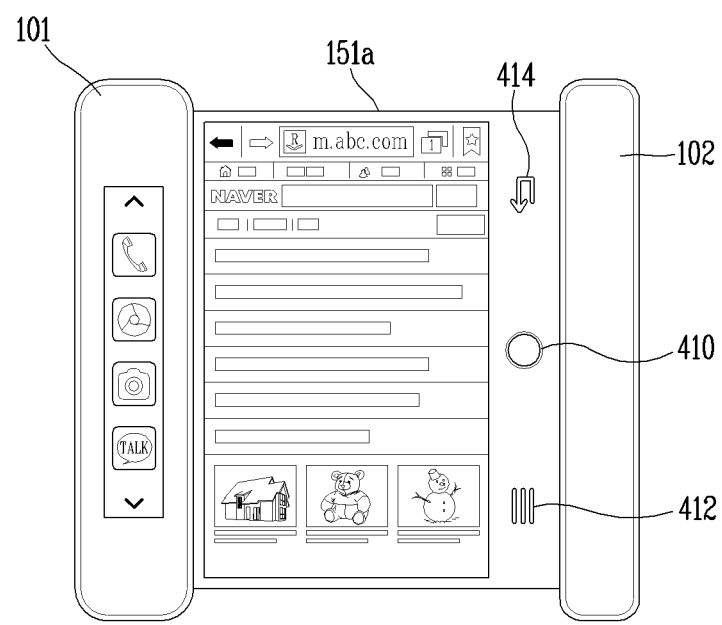

Referring to FIG. 4A, the rollable mobile terminal 100 may include first and second body units 101, 102, and a first touch screen 151a.

The controller 180 (see FIG. 1) senses at least one region of the first touch screen 151a exposed to an outside of at least one of the first and second body units 101, 102 using the sensing unit 140 (see FIG. 1), and sets the sensed at least one region as a display region.

When the display region is smaller than the reference size, one window may be displayed. An execution screen of a preset home screen page or an application may be displayed on the one window.

The application is a concept including a widget, a home launcher, and the like, and refers to all types of programs that can be run on the terminal. Accordingly, the application may be a program that performs functions of a web browser, video playback, message transmission/reception, schedule management, and application update.

When an execution screen of the application is displayed on the window, graphic objects for controlling information displayed on the first window may be further displayed. For example, as illustrated in the first view of FIG. 4A, a preset region is set at a lower end of the display region, and virtual buttons may be displayed in the preset region.

The preset region denotes a region in which an icon corresponding to a specific application preset by a user's selection or the controller 180 or a graphic object corresponding to a specific function is fixedly displayed. For example, instead of a hardware-implemented button that is not provided in the terminal body, a software-implemented virtual button may be displayed in the preset region. Hereinafter, a graphic object displayed in the preset region is referred to as a "virtual button."

The virtual buttons may include at least one of a virtual home button 410, a virtual menu button 412, and a virtual back button 414.

The virtual home button 410 is associated with at least one of a preset home screen page display function, a fingerprint recognition function, a function of displaying a recently executed list of apps, and a function related to payment. For example, when a short touch is applied to the virtual home button 410, the displayed screen information may be switched to a preset home screen page, and when a double touch is applied to the virtual home button 410, the recently executed list of apps may be displayed, and when a long touch is applied to the virtual home button 410, a fingerprint authentication for a fingerprint in contact with the virtual home button may be carried out while the touch is maintained.

The virtual menu button 412 is associated with a function of displaying preset menus, a function of displaying a recently executed list of apps, and a function of dividing a screen. For example, when a short touch is applied to the virtual menu button 412, information on the recently executed applications is displayed in the order of the executions. The information on the application may include at least one of at least part of the last displayed screen, an icon of the application, and a name of the application.

The virtual back button 414 is associated with a backward return function. For example, while the first screen information is being displayed, the first screen information may be switched to second screen information by a user input. When a touch is applied to the virtual back button 414 while the second screen information is being displayed, the second screen information is switched to the first screen information. For another example, in case where functions associated with the application are configured in a tree structure, when a touch is applied to the virtual back button 414 while an execution screen of a function corresponding to a child node is displayed, the display is switched to an execution screen of a function corresponding to a parent node.

Meanwhile, a position at which the preset region is displayed may vary as the display region is varied. More specifically, the controller 180 may display the preset region at a lower end of the display region or at a left end or a right end of the display region based on a screen ratio of the display region and/or a movement of at least one of the first and second body units.

For example, as shown in the first view of FIG. 4A, when a vertical length of the display region is larger than a horizontal length thereof, the preset region may be displayed at a lower end of the display region.

When roll-out occurs, a vertical length of the display region may be equal to or smaller than a horizontal length thereof, as illustrated in the second view of FIG. 4A. In this case, the preset region may be displayed at the left end or the right end of the display region.

The controller 180 displays the preset region at the right end of the display region when roll-out is generated by applying an external force to the second body 102 while the first body 101 is fixed, and displays the preset region at the left end of the display region when roll-out is generated by applying an external force to the first body 101 while the second body 102 is fixed.

The position at which the preset region is displayed may vary depending on a user input. For example, when an input of dragging and dropping the preset region to the left end of the display region is sensed while the preset region is displayed at the right end of the display region, the controller 180 may move the preset region from the right end to the left end of the display region.

On the other hand, in case of the rollable mobile terminal, the user may perform roll-out/roll-in by moving at least one of the first and second body units 101, 102 while holding the first and second bodies 101, 102. When a horizontal length of the display region is larger than a vertical length thereof, it is difficult for the user to touch the virtual button displayed at the center of the display region with his or her hand holding the terminal. However, according to the present disclosure, since a region displayed with the preset region is varied according to a body that has generated a movement, the virtual home button may be touched by the thumb of a hand that has created the movement.

Figure 4B:
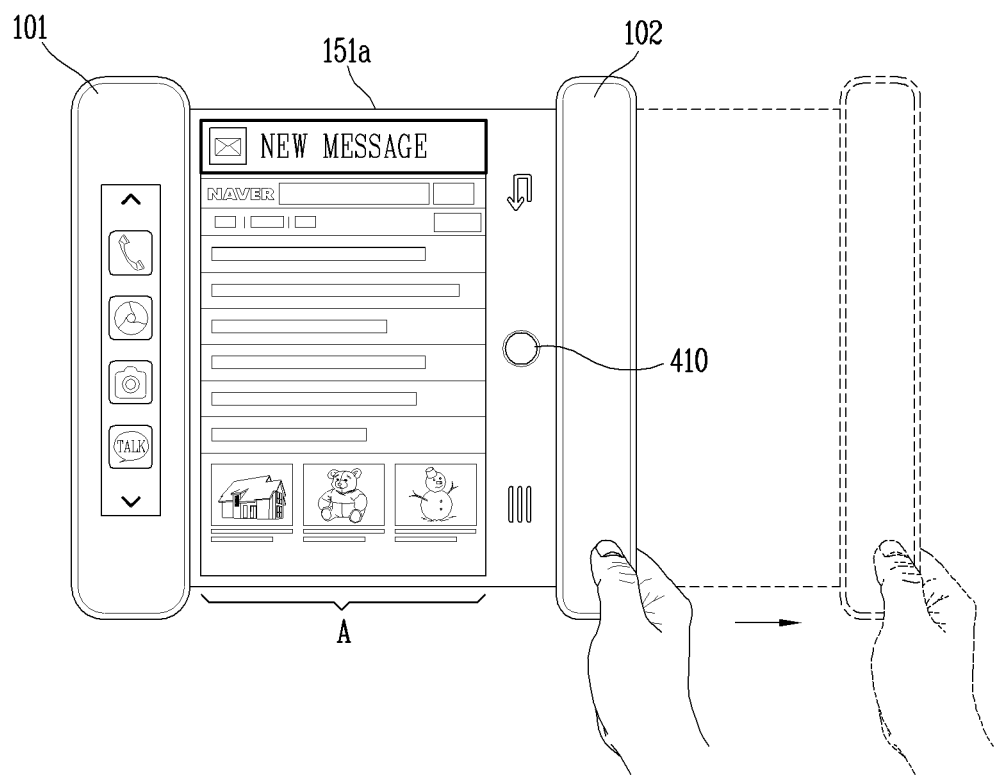
Figure 4B:
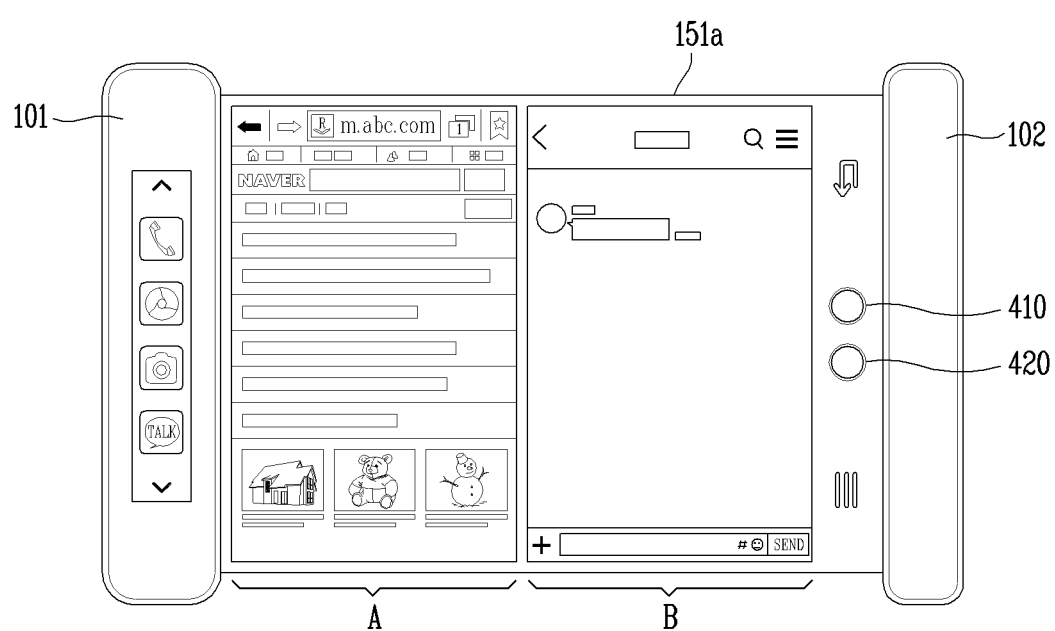

Meanwhile, referring to FIG. 4B, an event may occur in an application installed in the terminal while the first window (A) is displayed. More specifically, an event may occur in a second application while an execution screen of a first application is displayed in the display region. In this case, the controller 180 displays guide information for notifying the event in the display region.

The occurrence of an event may include for example, when there is a missed call, when there is an application to be updated, when a message arrives, charging, power on, power off, an LCD awake key, an alarm, an incoming call, a missed notification of the terminal, and the like.

For another example, when specific information is received through the wireless communication unit of the terminal, an event has occurred in an application related to the specific information, and the controller senses it. Alternatively, in case where there is an item entered by the user in schedule management, when it becomes a date corresponding to the item, it is regarded that an event has occurred in a schedule management application.

The guide information includes an image of part of the display region, and information related to the event is displayed within the image on the image.

When the display region is extended by an external force while the guide information is displayed, the controller 180 displays an execution screen of the first application in the first region (A) of the extended display region, as shown in the second view of FIG. 4B, and displays an execution screen of the second application in the second region (B) of the extended display region. In other words, when roll-out occurs during the display of the first window (A), the controller 180 may display the first and second windows (A, B) in the display region.

Moreover, the controller 180 controls the first touch screen 151a such that a first virtual home button 410 for the execution screen of the first application and a second virtual home button 420 for the execution screen of the second application are displayed on the extended display region.

When it is desired to check event occurred information while maintaining the display of previously displayed screen information, the user may use roll-out.

Although not shown in the drawing, when the display region is extended by an external force while the first and second windows are displayed, the controller 180 may display the first and second windows, and the third window, and display the first and second virtual home buttons, and the third virtual home button corresponding to the third window in the extended display region.

When roll-out occurs while guide information for notifying an event is displayed, a new window is displayed in the extended display region, and an execution screen of an event occurred application is displayed on the new window.

On the contrary, when roll-out occurs while an event is not occurred, a new window is displayed in the extended display region, but preset window information may be displayed on the new window.

Here, the preset screen information may be a preset home screen page, an execution screen of an application which has been executed most recently but whose execution screen is not displayed in the display region, an execution screen of an application executed in the background, or an execution screen of an application preset by the user.

On the other hand, when roll-in occurs while a plurality of windows are displayed, the controller 180 may end the display of at least one of the plurality of windows based on the movement of at least one of the first and second bodies 101, 102.

Figure 4C:
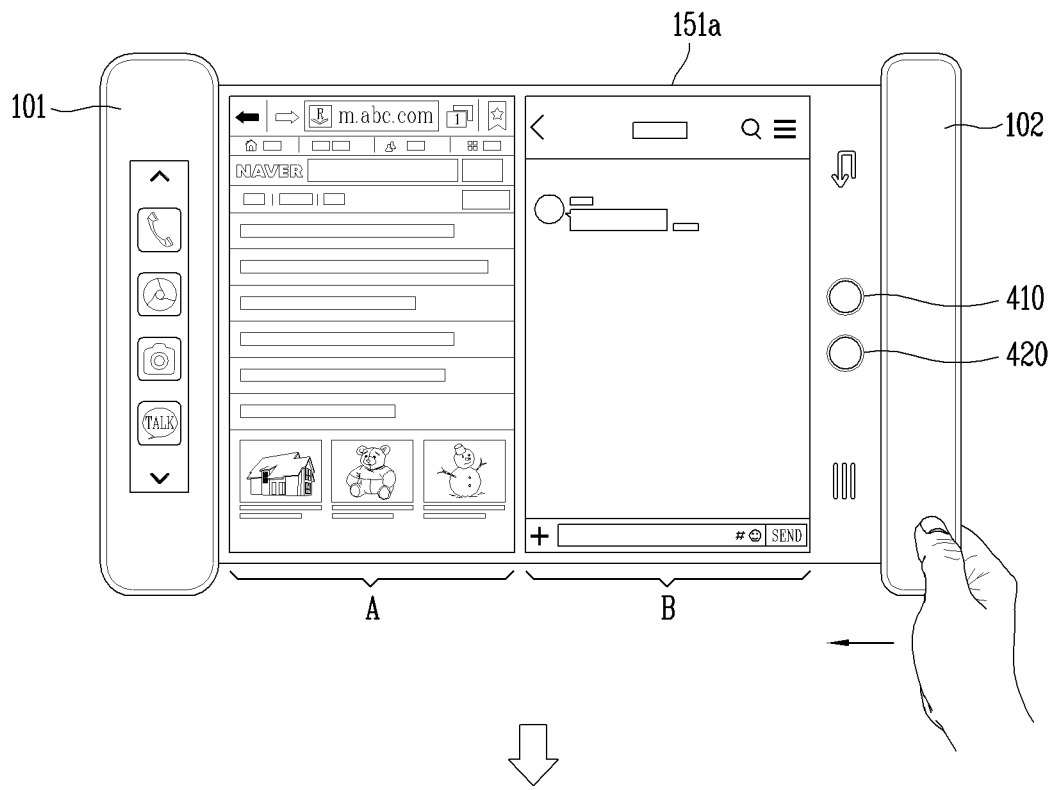
Figure 4C:
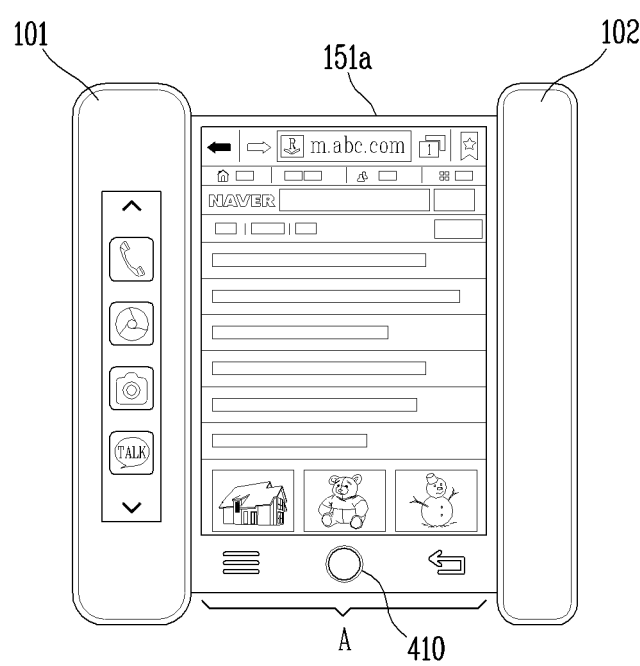

For example, as illustrated in FIG. 4C, when roll-in is generated by the second body 102 in a state that the first body 101 is fixed while the first and second windows (A, B) are displayed, the controller 180 may end the display of the second window (B) that has been displayed at a portion adjacent to the second body 102. As a result, the second window (B) between the first and second windows (A, B) disappears and only the first window (A) is displayed in the display region. As the display of the second window (B) is ended, the display of the second virtual home button 420 in the preset region is also ended.

Figure 4D:
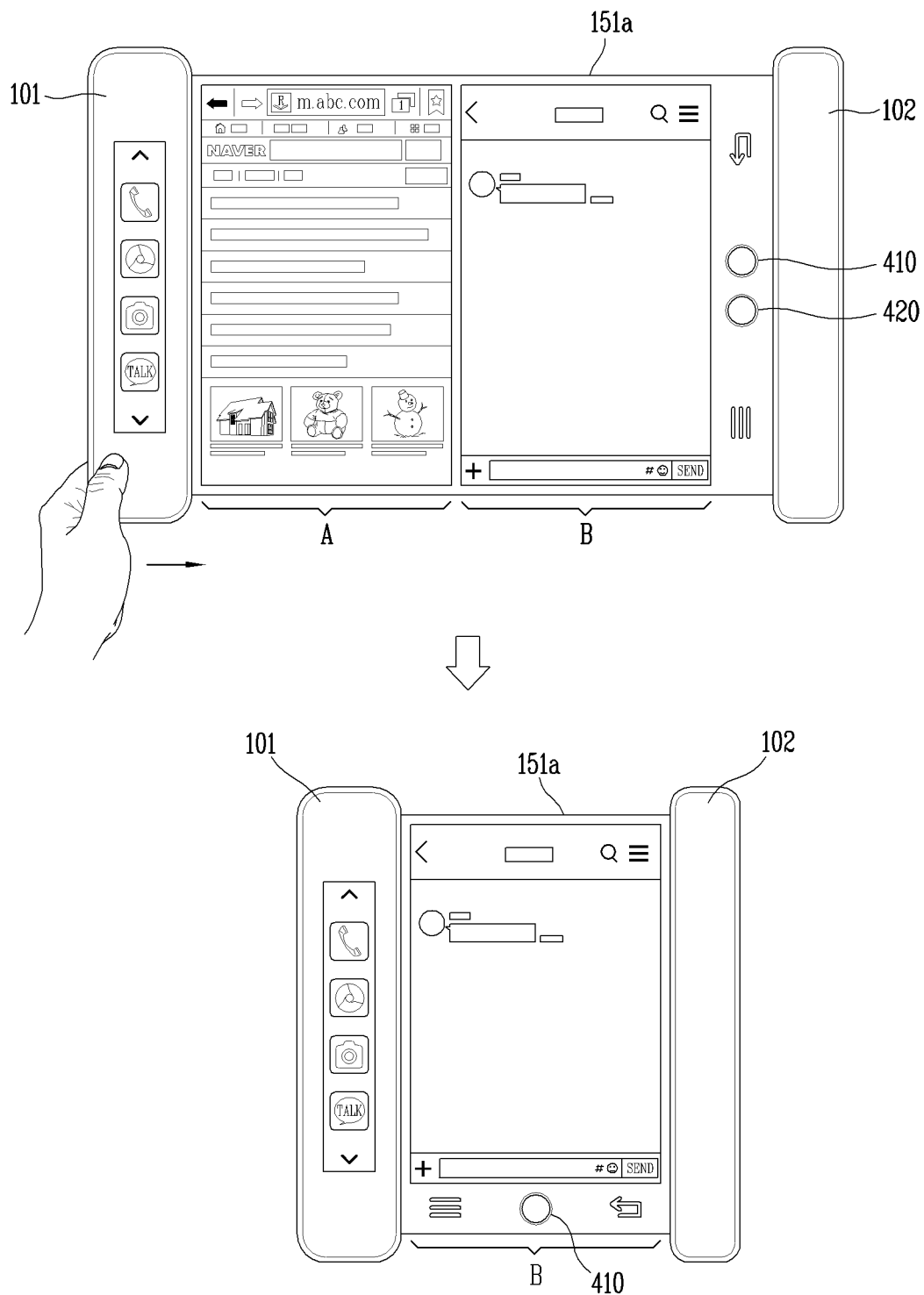

For another example, as illustrated in FIG. 4D, when roll-in is generated by the first body 101 in a state that the second body 102 is fixed while the first and second windows (A, B) are displayed, the controller 180 may end the display of the first window (A) that has been displayed at a portion adjacent to the first body 101. As the display of the first window (A) is ended, the display of the first virtual home button 410 in the preset region disappears.

The user may perform roll-in using any one of the first and second bodies 101, 102, thereby selecting a window to end the display as well as ending the display of the selected window.

Hereinafter, the operation of the rollable mobile terminal according to a touch input applied to the virtual home button will be described in detail.

Figure 5A:
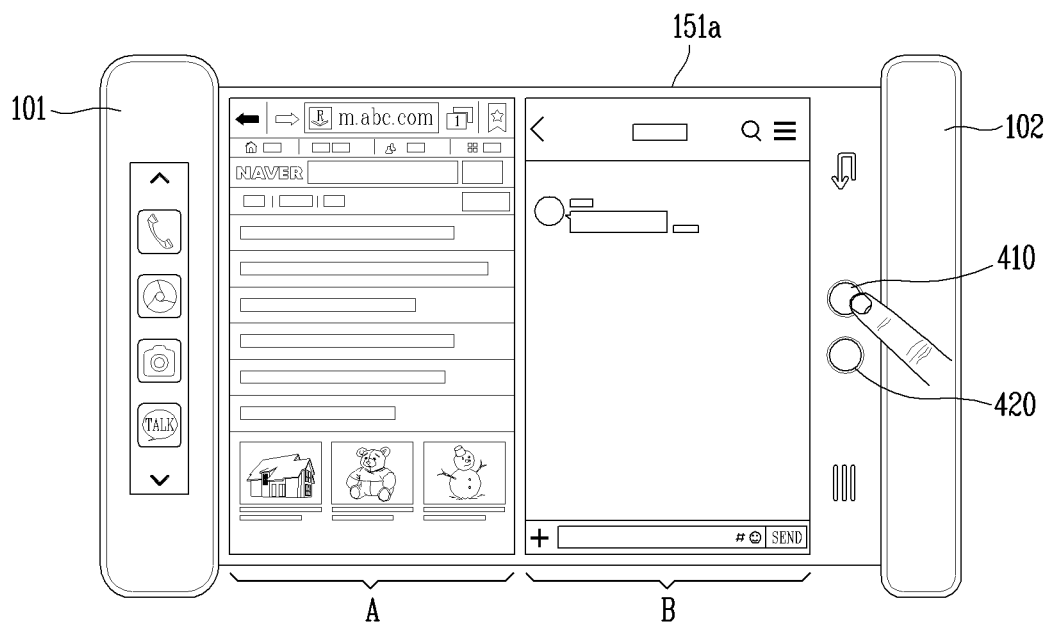
FIGS. 5A and 5B are conceptual views for explaining the operation of a rollable mobile terminal related to a plurality of virtual home buttons.
Figure 5A:
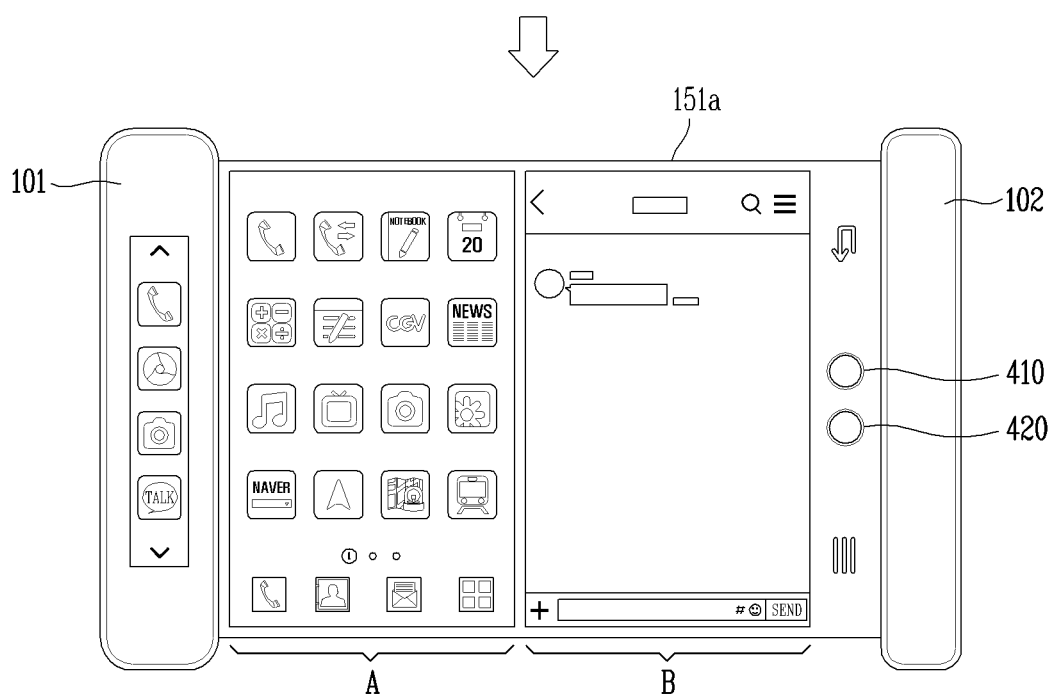
Figure 5B:
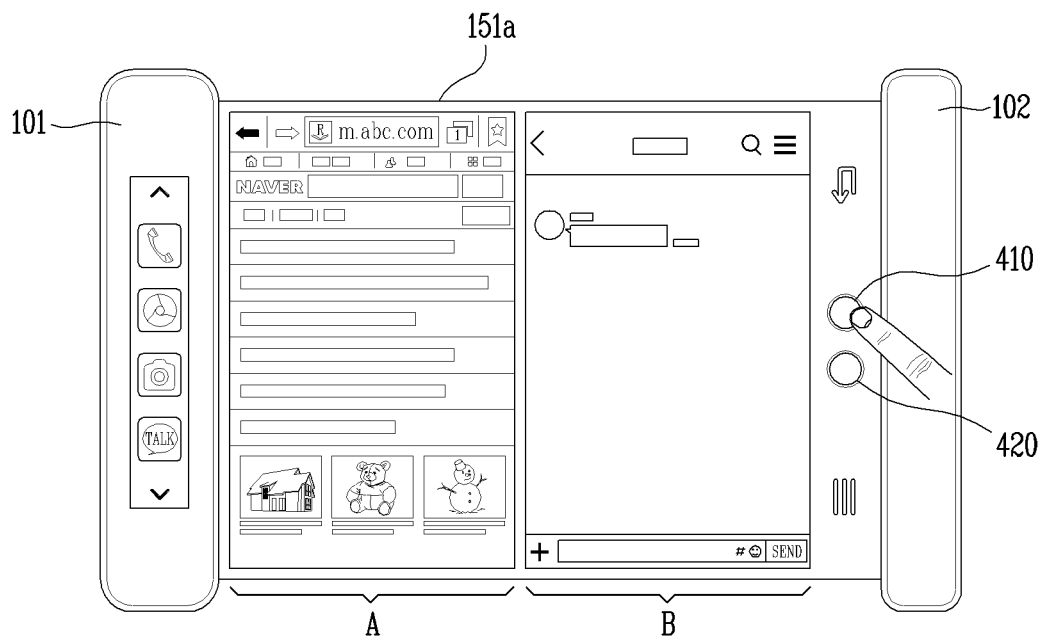
Figure 5B:
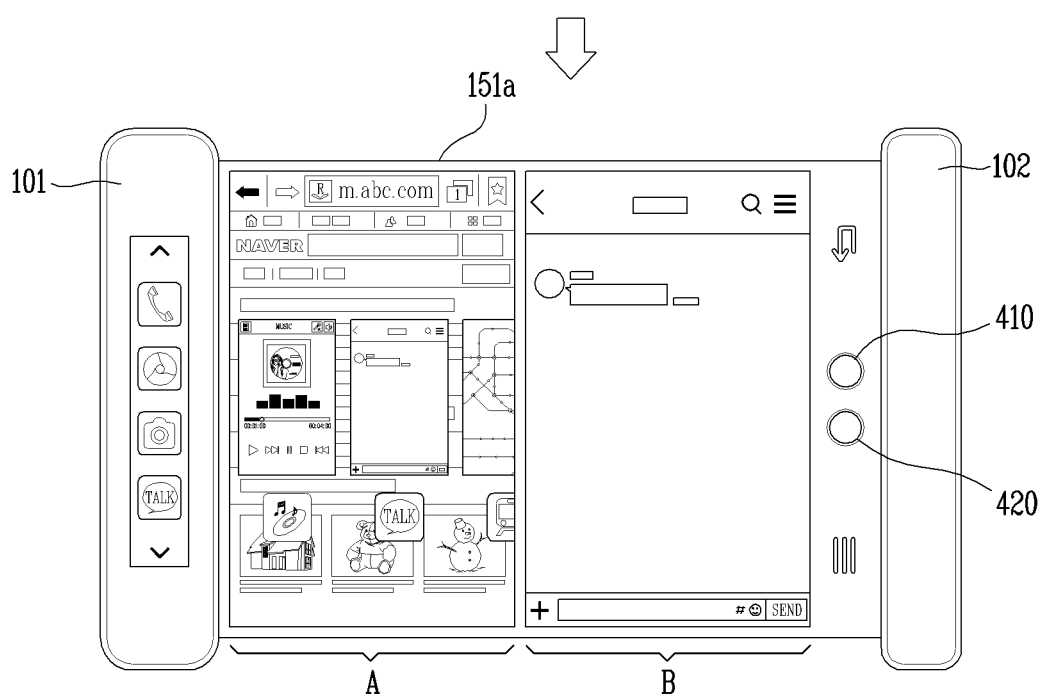
Figure 6A:
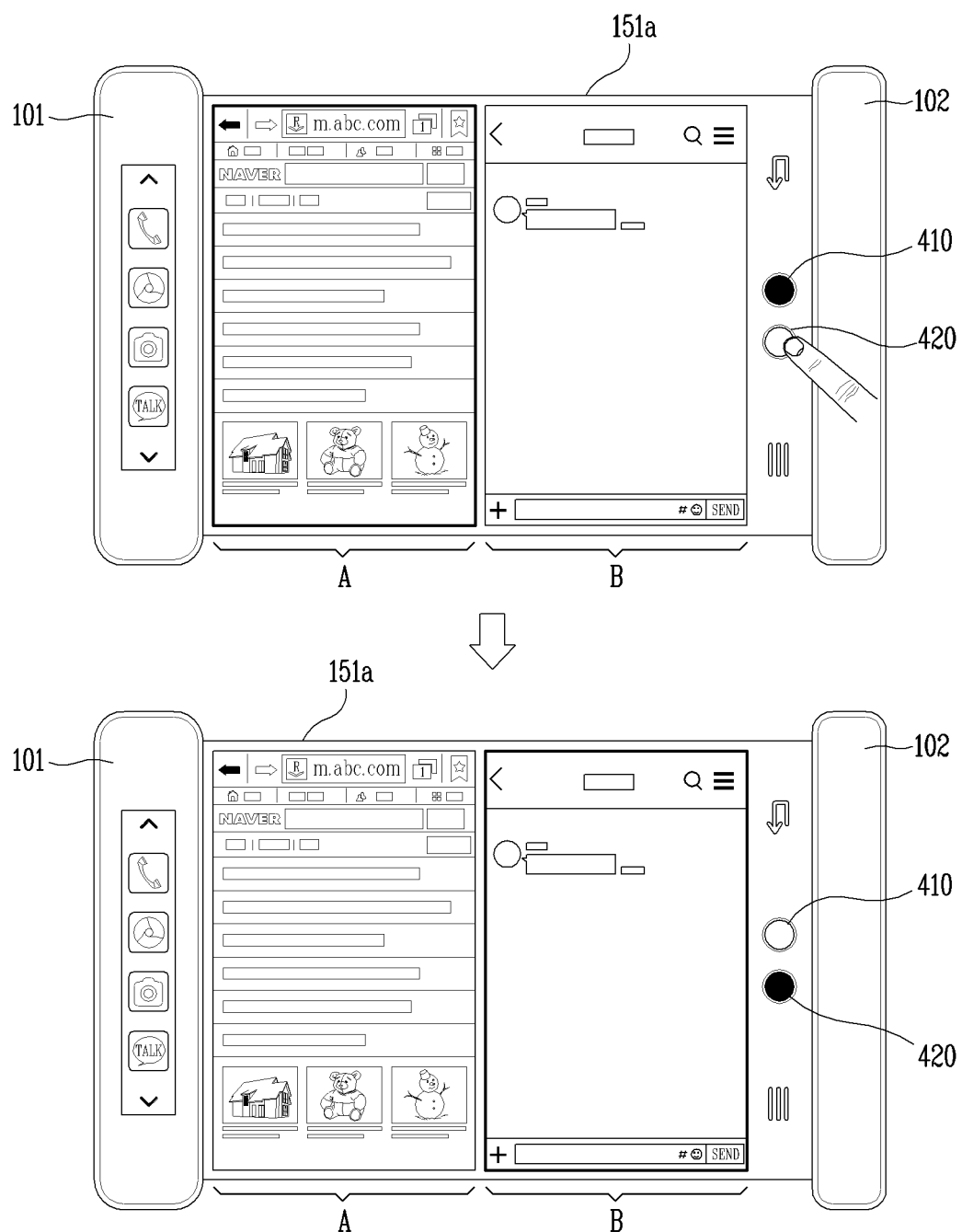
FIGS. 6A and 6B are conceptual views illustrating the operation of a rollable mobile terminal related to a back button displayed together with virtual home buttons.
Figure 6B:
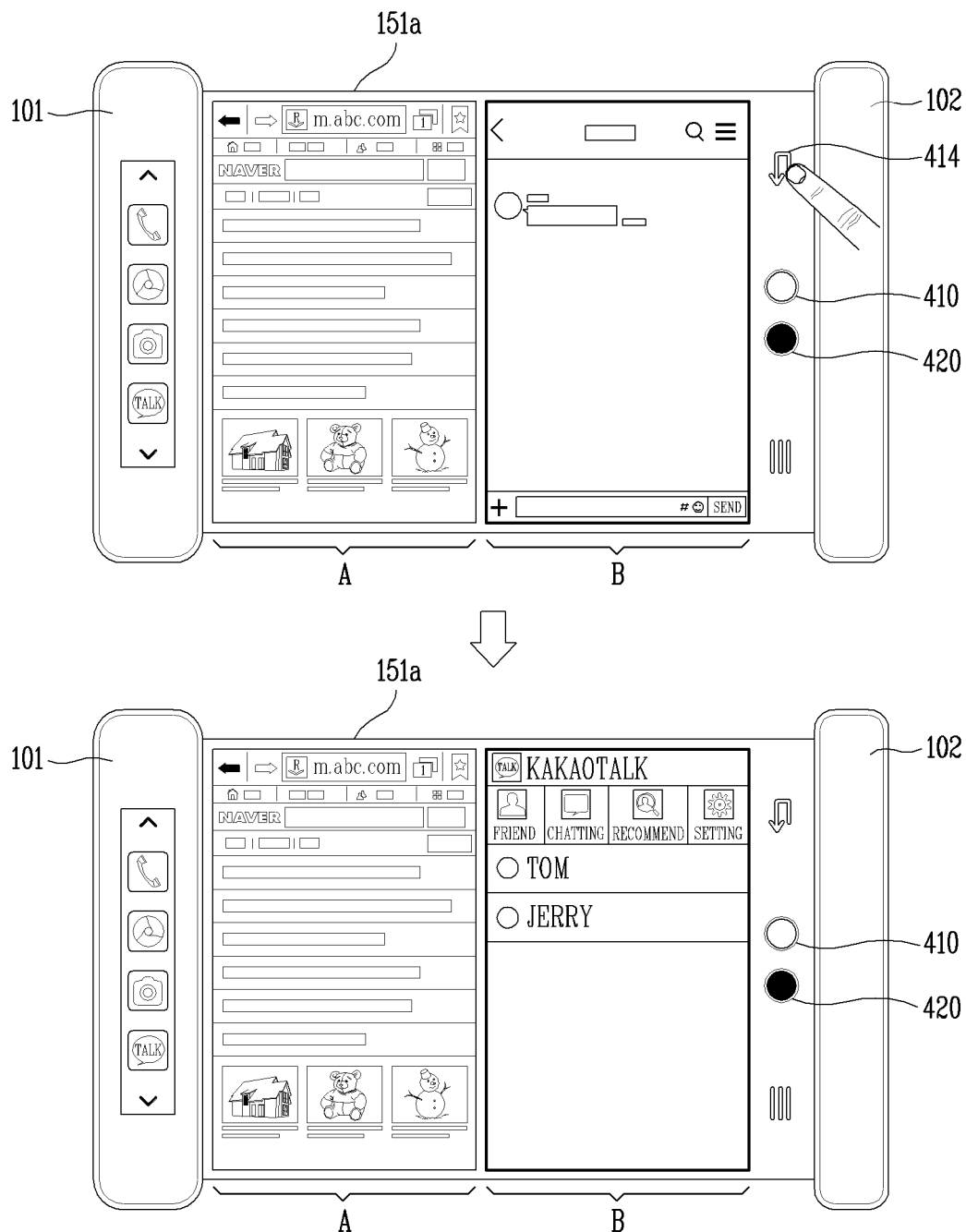

FIGS. 5A and 5B are conceptual views for explaining the operation of the rollable mobile terminal related to a plurality of virtual home buttons, and FIGS. 6A and 6B are conceptual views for explaining the operation of the rollable mobile terminal related to a back button displayed along with the virtual home buttons.

Since the existing home button is associated with a function suitable for a single display, a home button in a roller-type display capable of displaying a multi-window like a rollable mobile terminal must be operated differently from the existing one.

In the rollable mobile terminal according to the present disclosure, when displaying a plurality of windows in the display region, the controller 180 displays a plurality of virtual home buttons corresponding to the plurality of windows together. For example, when the first and second windows are included in the plurality of windows, a first virtual home button corresponding to the first window and a second virtual home button corresponding to the second window may be displayed in the display region.

Moreover, the controller 180 senses a control command related to information displayed on the first window using a touch input applied to the first virtual home button, and senses a control command related to information displayed on the second window using a touch input applied to the second virtual home button.

When a preset type of touch input is applied to the first virtual home button, the controller 180 executes a function corresponding to the applied touch input while maintaining the display of the second window, and switches information displayed on the first window to other information accordingly.

Referring to FIG. 5A, an execution screen of the first application is displayed on the first window (A) and an execution screen of the second application is displayed on the second window (B). The first and second virtual home buttons 410, 420 may be displayed in the preset region.

For example, when a short touch is applied to the first virtual home button 410, the controller 180 switches the execution window of the first application for the first window (A) to a home screen page previously set on the first window. At this time, an execution screen of the second application is continuously displayed on the second window (B).

For another example, as illustrated in FIG. 5B, when a double touch is applied to the first virtual home button 410, the controller 180 may display a list of applications recently executed in the first window (A). When any one of items included in the application list is selected, any one of the execution screens instead of the execution screen of the first application is displayed on the first window (A).

Meanwhile, the controller 180 may select any one of a plurality of windows being displayed in the display region based on a touch input applied to any one of virtual home buttons included in the preset region.

As illustrated in FIG. 6A, when the first and second windows (A, B) are displayed in the display region, the first window (A) displayed at the leftmost side may be selected in advance. At least one of the first window (A) and the first virtual home button 410 may be highlighted to guide that the first window (A) is selected.

Here, highlighting processing refers to a graphic processing for distinguishing a selected window from a non-selected window, and the highlighting processing may be carried out by a method of processing a boundary of the selected window as a bold or blinking a virtual home button corresponding to the selected window.

When a touch is applied to the second virtual home button 420 while the first window (A) is selected, the controller 180 may select the second window (B) instead of the first window (A). Accordingly, the highlight processing for at least one of the first window (A) and the first virtual home button 410 is ended, and highlighting processing on at least one of the second window (B) and the second virtual home button 420 is carried out.

When any one window is selected, a function corresponding to a virtual button included in the preset region is applied to the selected window. For example, as illustrated in FIG. 6B, when a touch is applied to the virtual back button 414 while the second window (B) is selected, a backward return function is executed for the second window (B), and information displayed on the first window (A) is displayed as it is.

It is not required to display a plurality of virtual back buttons for the windows being displayed in the display region, and only one virtual back button is displayed, and thus it may be possible to secure more display space.

Although not shown in the drawing, when a touch is applied to the second virtual home button 420 while the second window (B) is selected, the controller 180 switches an execution screen of the second application for the second window (B) to a home screen page previously set on the second window (B).

FIGS. 7A through 7F are conceptual views for explaining a method of controlling windows displayed in a display region using a plurality of virtual home buttons.

Figure 7A:
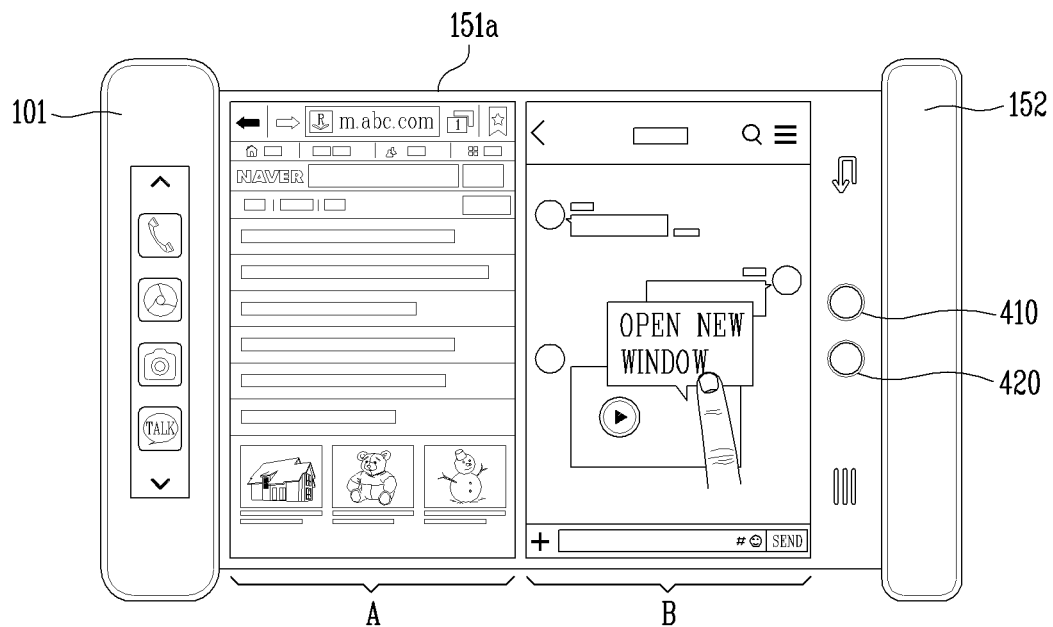
FIGS. 7A through 7F are conceptual views for explaining a method of controlling windows displayed in a display region using a plurality of virtual home buttons.
Figure 7A:
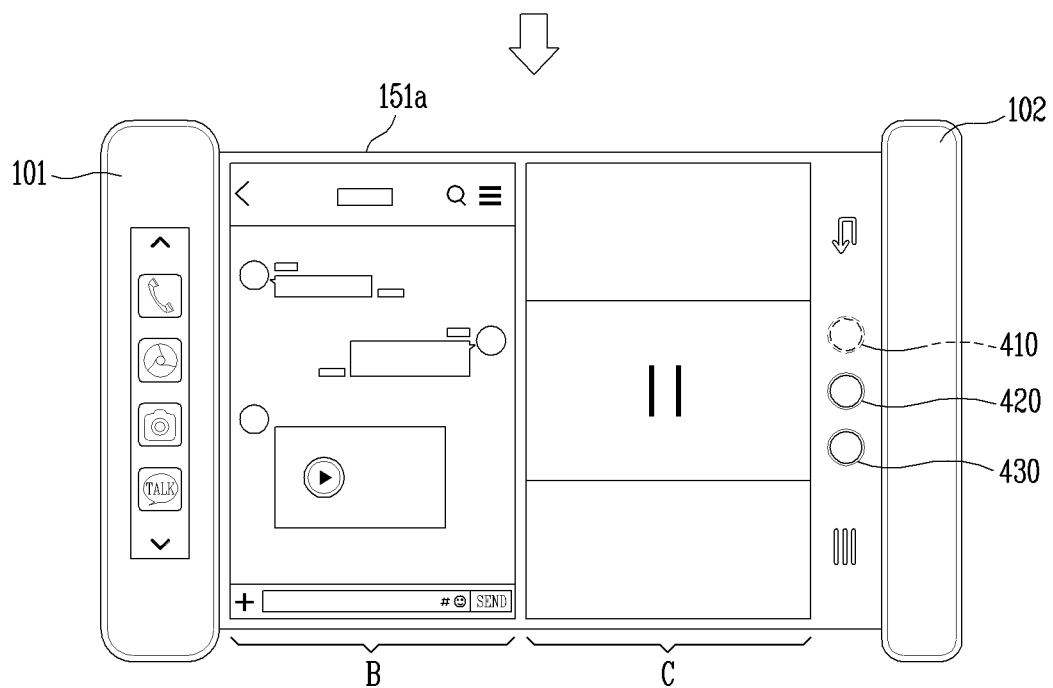

Referring to FIG. 7A, the first and second windows (A, B) and a preset region may be displayed in the display region. An execution screen of the first application is displayed on the first window (A), and an execution screen of the second application is displayed on the second window (B). For an example, the first application may be a web browser, and the second application may be a messenger.

The preset region includes first and second virtual home buttons 410, 420, and may further include a preset virtual button.

When the preset region is displayed on the right side of the display region, a plurality of virtual home buttons are sequentially displayed along a longitudinal direction of the second body in a region of the display region adjacent to the second body. As a window is located on the left side in the display region, a virtual home button corresponding thereto is located at an upper side the preset region.

For example, when the first and second windows (A, B) are displayed in the display region from the left side, the first virtual home button 410 is displayed at a position higher than the second virtual home button 420. Through this, the user may intuitively recognize a specific virtual home button corresponding to a specific window.

On the other hand, a new window open function may be executed by a user input. For example, a link may be included in the second window (B), and a new window open command for the link may be entered from the user.

Here, the new window open function denotes a function of displaying a new window in the display region.

When a new window open function is executed while the first and second windows (A, B) are displayed, the controller 180 controls the touch screen to display a third window (C), which is a new window, in the display region. Specifically, the controller 180 controls the touch screen to allow any one of the first and second windows (A, B) disappear from the display region, and controls the touch screen to display the other one of the first and second windows (A, B) and the third window (C) in the display region.

For example, as illustrated in FIG. 7A, when a new window open function for digital content received from the counterpart terminal is executed, the display of the first window (A) is ended, and the second window (B) is displayed at a position where the first window (A) has been displayed, and the third window (C) is displayed at a position where the second window (B) has been displayed.

Information connected to the link is displayed in the third window (C), and a playback screen of the digital content is displayed in the third window (C).

As a new window is added based on the right end of the display region, an animation effect of moving a window that has been displayed previously to the left one by one may occur. In this case, a window displayed adjacent to the right end of the display region may gradually move to the left and disappear.

As the third window (C) is newly displayed, a third virtual home button 430 for the third window (C) may be displayed in the display region.

The first to third virtual home buttons 410-430 may be displayed together in the display region.

In this case, the controller 180 may display the first virtual home button 410 separately from the second and third virtual home buttons 420, 430 to guide a window that is not displayed in the display region. In other words, graphic processing different from the second and third virtual home buttons 420, 430 may be carried out on the first virtual home button 410 to guide that the first window (A) including the execution screen of the first application is not displayed in the display region.

On the other hand, when a touch is applied to a virtual home button where a window is not displayed in the display region, the controller may display the relevant window in the display region.

Figure 7B:
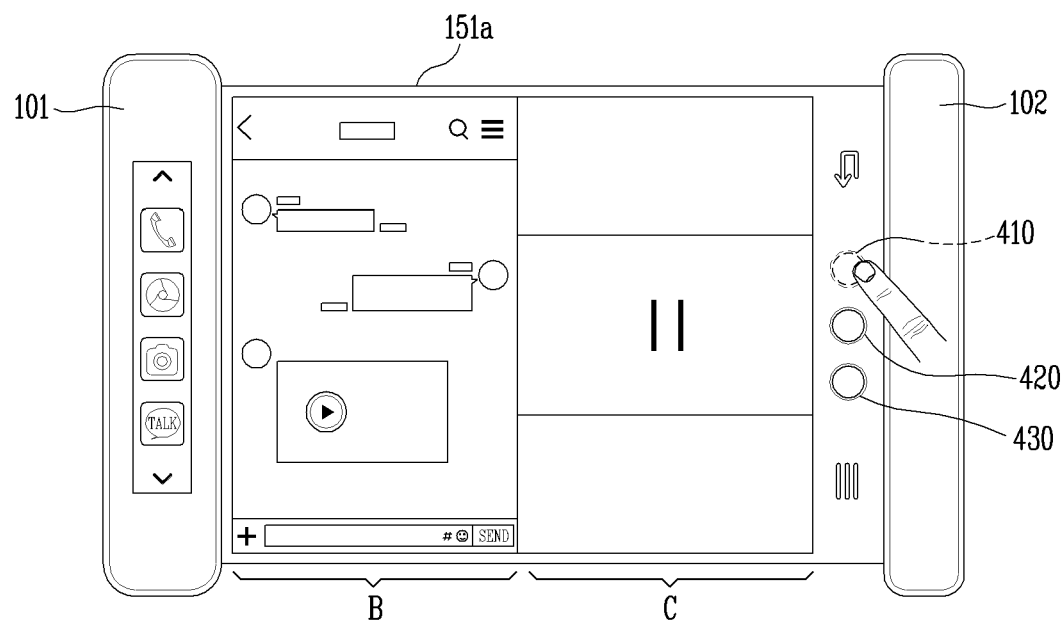
Figure 7B:
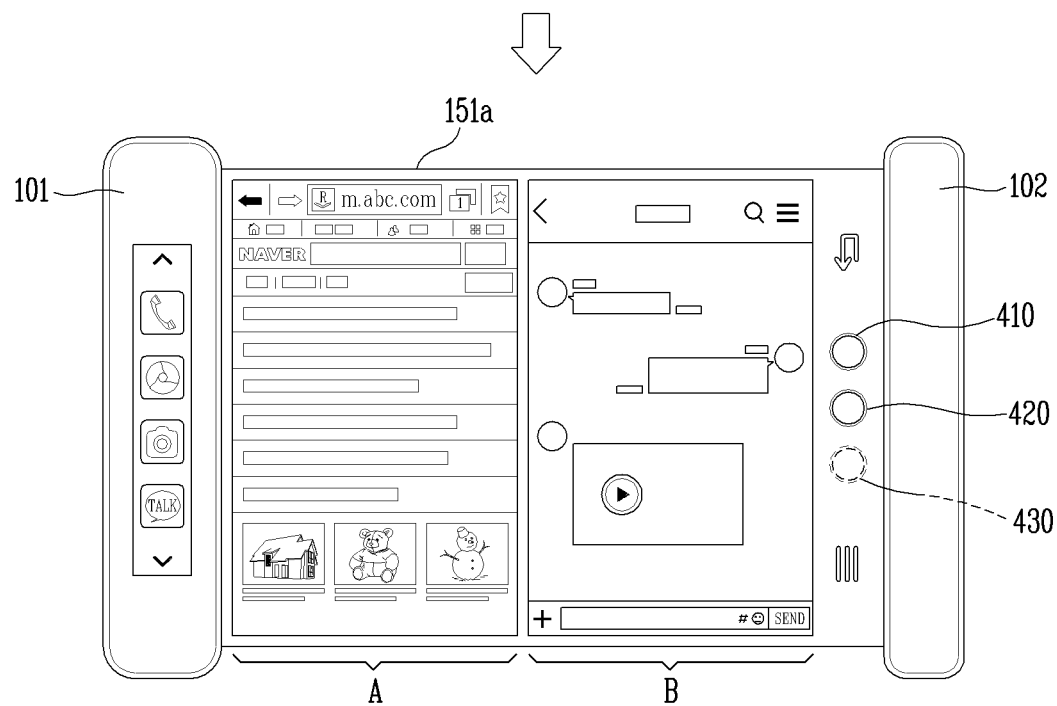

For example, as illustrated in FIG. 7B, when a touch is applied to the first virtual home button 410, the controller 180 may display the first window (A) in the display region. At this time, the previously displayed window moves to the right one by one, and the third window (C) displayed adjacent to the right end of the display region gradually moves to the right and disappears. As the first and second windows (A, B) are displayed in the display region and the third window (C) disappears, the third virtual home button 430 corresponding to the third window (C) is displayed in a distinguished manner from the first and second virtual home button 410, 420. Through this, the user may recognize that the third window (C) is not displayed in the display region.

When a drag input is applied to any one of the first through third virtual home buttons 410-430, the controller 180 processes a window corresponding to the any one virtual home button differently depending on a point from which the drag input is released.

For such an example, the display position of at least one of the first through third virtual home buttons 410-430 may be changed, and the display position of a window corresponding to the at least one virtual home button may be changed by the drag input.

Figure 7C:
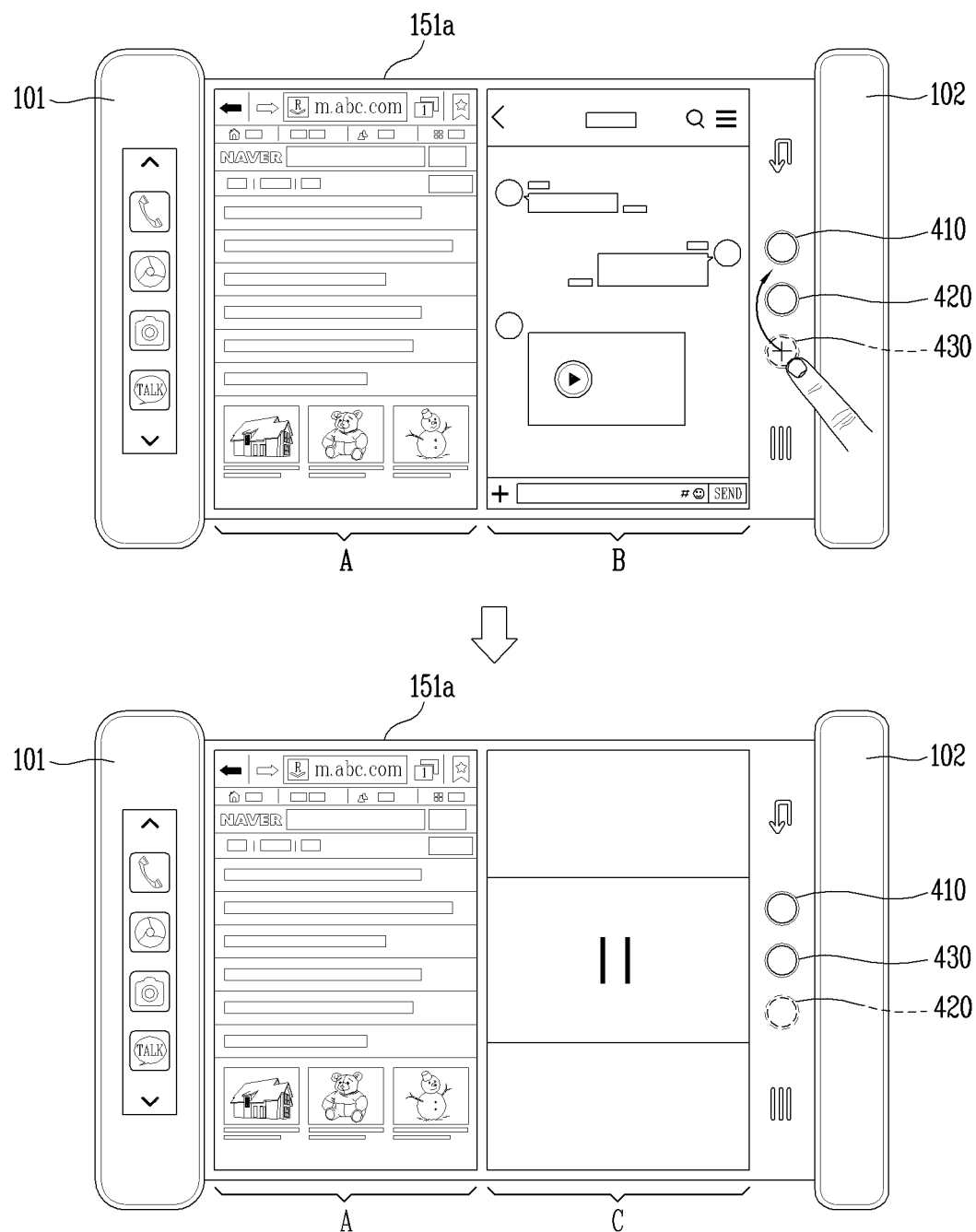

For example, as illustrated in FIG. 7C, when a drag input for moving the third virtual home button 430 between the first virtual home button 410 and the second virtual home button 420 is applied, the third virtual home button 430 is displayed between the first and second virtual home buttons 410, 420. In this case, the display order of the windows is changed from an order of the first through third virtual home buttons (410→420→430) to an order of the first, third and second virtual home buttons (410→430→420).

As the display order is changed, the second window (B) that has been displayed in the display region disappears from the display region, and the third window (C) that has not been displayed in the display region is displayed in the display region. In other words, the second window (B) is switched to the third window (C).

Although not shown in the drawing, when a drag input for moving the third virtual home button 430 over the first virtual home button 410 is applied, the display order of windows is changed from an order of the first through third virtual home buttons (410→420→430) to an order of the third, first and second virtual home buttons (430→410→420). Accordingly, the first window (A) may be switched to the third window (C), and the second window (B) may be switched to the first window (A).

Meanwhile, when a drag input applied to one of the virtual home buttons 410-430 is released from an edge of the touch screen, the controller 180 controls the touch screen in such a manner that a virtual home button to which the drag input is applied and a window corresponding thereto disappear from the display region.

Figure 7D:
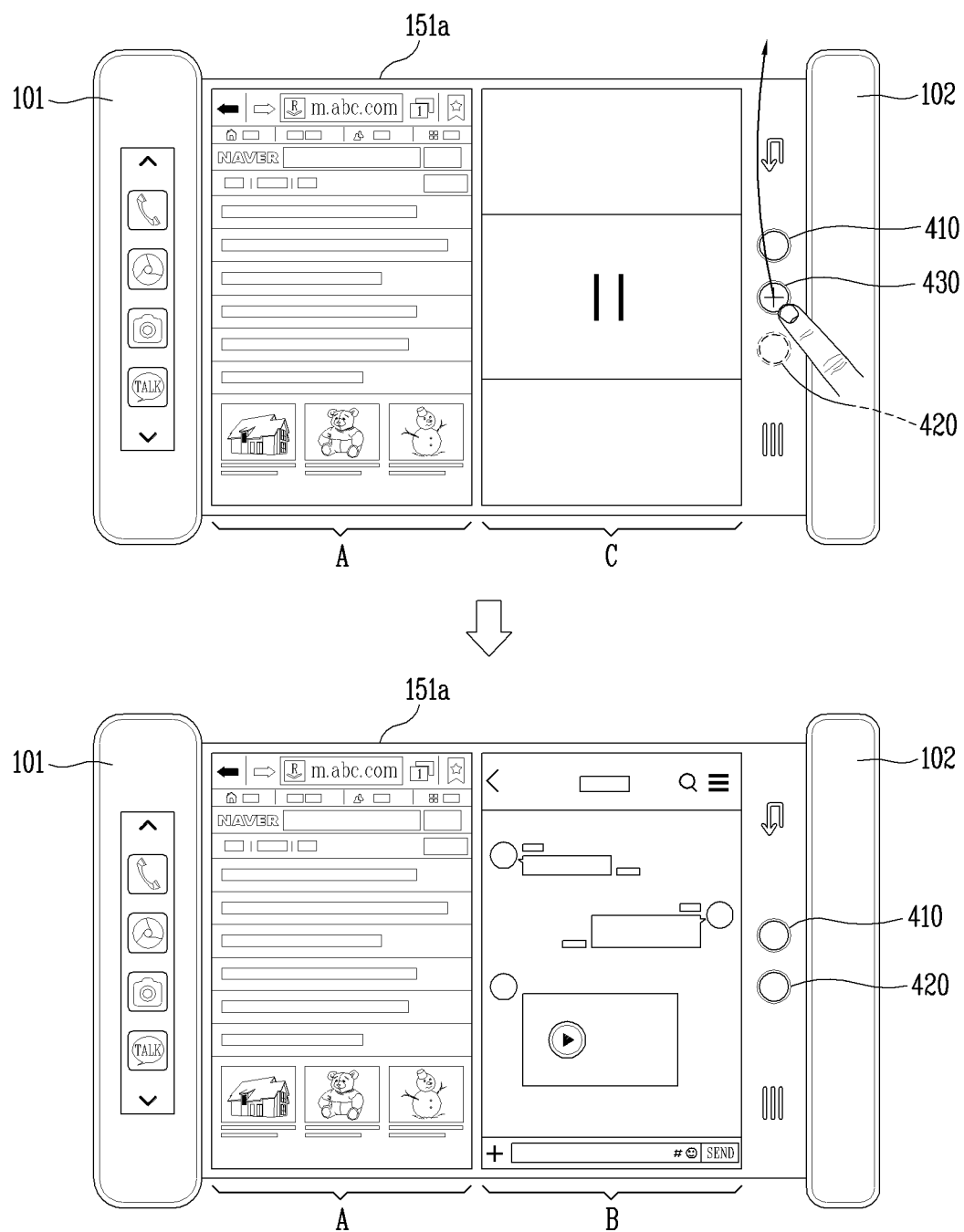

For example, as illustrated in FIG. 7D, when the drag input applied to the third virtual home button 430 is released to an edge of the touch screen, the controller 180 may end the display of the third virtual home button 430 and the third window (C). As the third window (C) disappears from the display region, a second window (B) which has not been displayed in the display region is displayed in the display region.

Meanwhile, a drag input applied to any one of the virtual home buttons 410-430 may be released from a position where another one is displayed. In this case, the controller 180 may end the display of a window corresponding to the another one, and display a window corresponding to the any one in a region where the window corresponding to the another one has been displayed. A size of the window corresponding to the any one of the above is extended to a region where the window corresponding to the another one has been displayed.

Figure 7E:
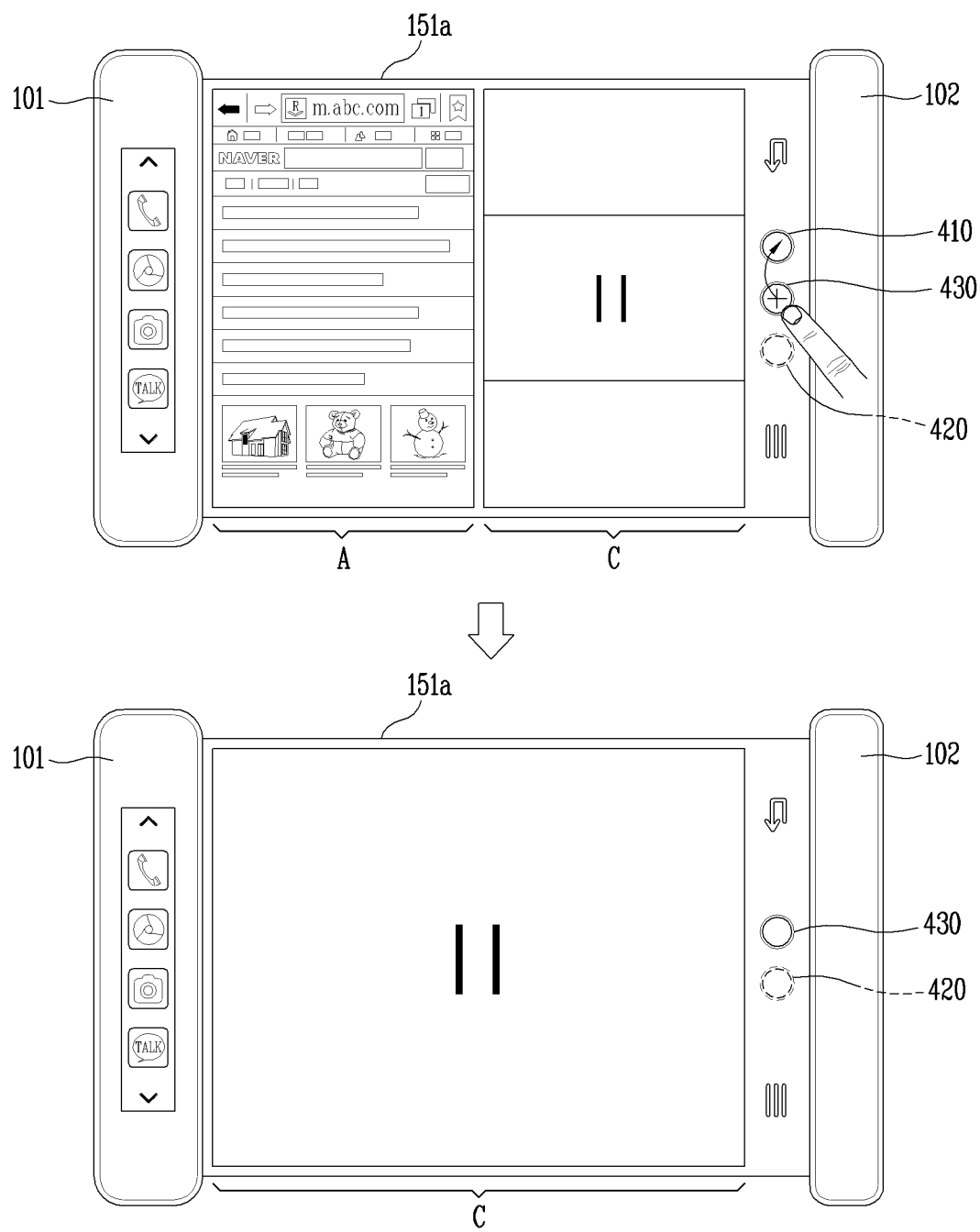

For example, as illustrated in FIG. 7E, when a drag input applied to the third virtual home button 430 is released from a region displayed with the first virtual home button 410 the controller 180 merge the first window (A) and the third window (C). The third window (C) is extended from a previously displayed region in the display region to a region displayed with the first window (A), and the first window (A) disappears from the display region. Furthermore, the first virtual home button 410 disappears from the display region.

As a result, the user may end the display of any one window while at the same time extending a region displayed with another window. Since a plurality of functions can be executed by a single drag input, user convenience is enhanced.

Meanwhile, the controller 180 may guide screen information included in the window for the user using the virtual home button. Specifically, when an execution screen of the first application is displayed on the first window and an execution screen of the second application is displayed on the second window, information related to the first application may be displayed on the first virtual home button, and information related to the second application may be displayed on the virtual home button.

Figure 7F:
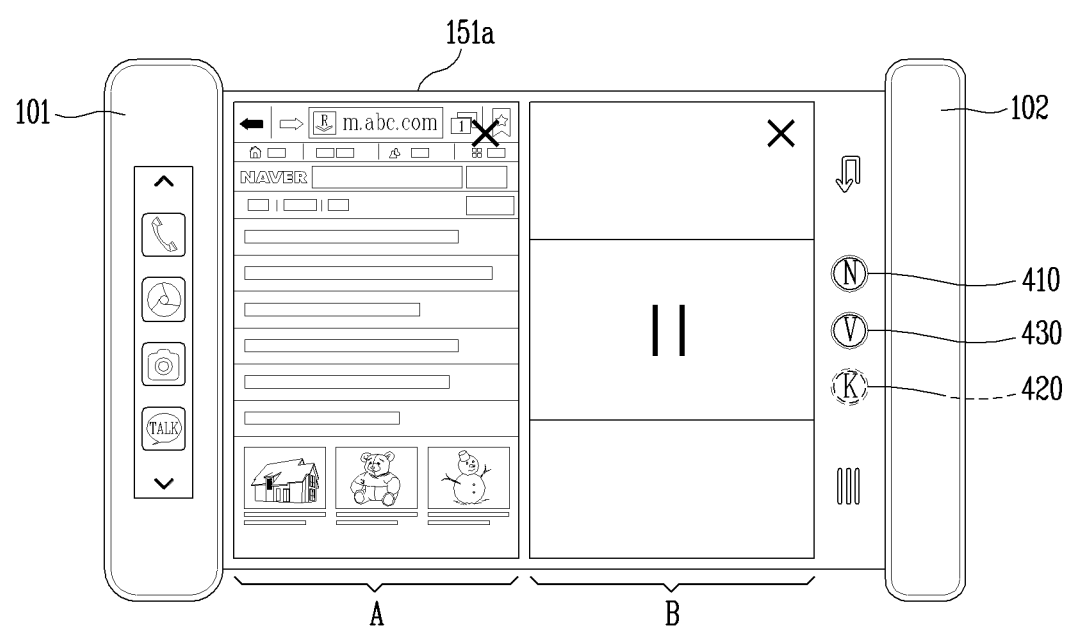

For example, as illustrated in FIG. 7F, when an execution screen of a NAVER application is displayed on the first window (A), information (N) related to the NAVER application is displayed on the first virtual home button 410.

Here, information related to a application may include at least one of an icon of the application, a name of the application, an initial of the application, and a thumbnail image corresponding to an execution screen of the application.

The information associated with the application may be replaced with a number of a window corresponding to a virtual home button. For example, when the first to third windows are displayed from the left side of the display region, the numbers from 1 to 3 may be sequentially assigned to the respective windows. In this case, numeral 1 may be displayed on the first virtual home button, and numeral 2 may be displayed on the second virtual home button.

Through this, it may be possible to intuitively recognize to which window the virtual home button to use corresponds.

Moreover, indicator X may be generated along with the windows. When the indicator X display is touched, the display of the relevant window and a virtual home button corresponding to the relevant window is ended. The user may simply end the display of a specific window using the indicator X.

On the other hand, when a drag-and-drop input to any one of the first through third virtual home buttons 410-430 is sensed, the controller 180 may control the touch screen to display any one of an execution screen of the first application, an execution screen of the second application, and information linked to the link in a first region of the display region, and to display another one in a second region of the display region, and not to display the remaining one on the display region. Moreover, a virtual home button corresponding to the remaining one may be displayed to be distinguished from other virtual home buttons to guide that the remaining one is not displayed in the display region.

Hereinafter, various modifications related to the display positions of the virtual home buttons will be described in detail.

Figure 8:
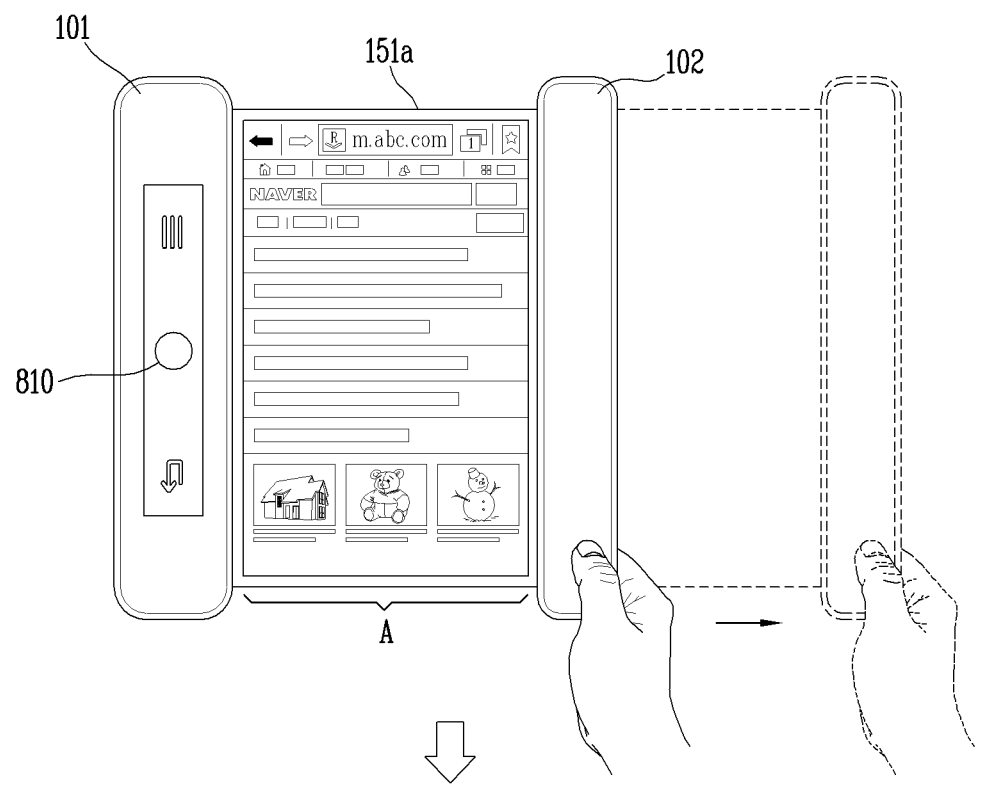
FIG. 8 is a conceptual view illustrating a method of displaying virtual home buttons in a rollable mobile terminal having first and second touch screens.
Figure 8:
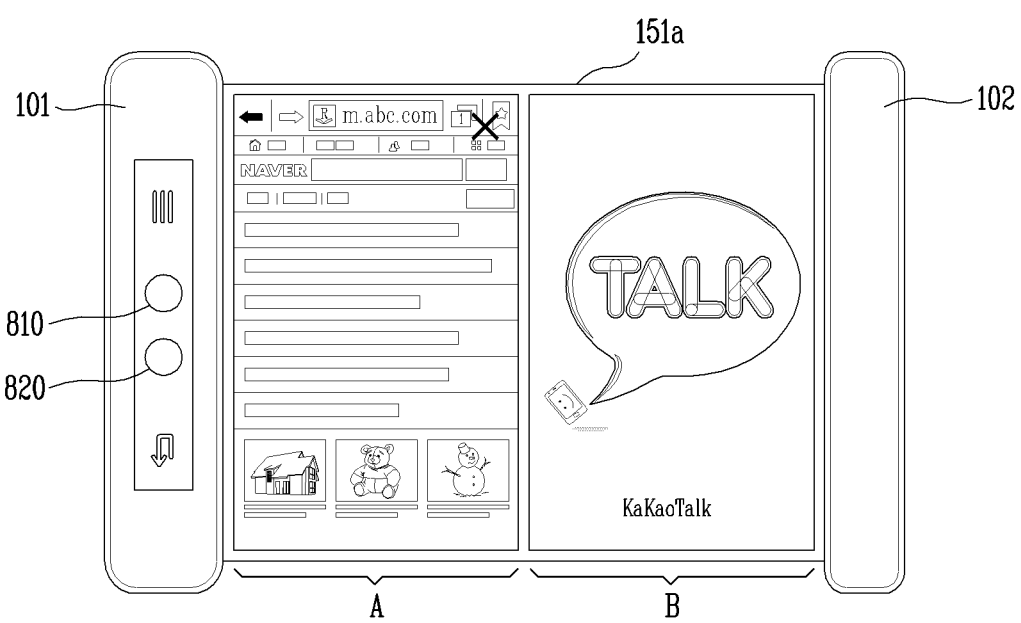

FIG. 8 is a conceptual view illustrating a method of displaying virtual home buttons in a rollable mobile terminal having first and second touch screens.

As illustrated in FIG. 8, when the rollable mobile terminal includes the first and second touch screens 151a, 151b, the virtual home button may be displayed on the second touch screen 151b. In other words, a window may be displayed in the display region of the first touch screen 151a, and a virtual home button for the window may be displayed on the second touch screen 151b.

For example, when the first window (A) is displayed in the display region, the first virtual home button 810 is displayed on the second touch screen 151b. When the display region is larger than a reference size by roll-out, the first and second windows (A, B) are displayed in the display region, and the first and second virtual home buttons 810, 820 are displayed on the second touch screen 151b.

Since the window and the virtual home button are displayed on the first and second touch screens 151a, 151b, information displayed on the window is prevented from being covered by the virtual home button, and the user may use the display region as a large screen.

Figure 9:
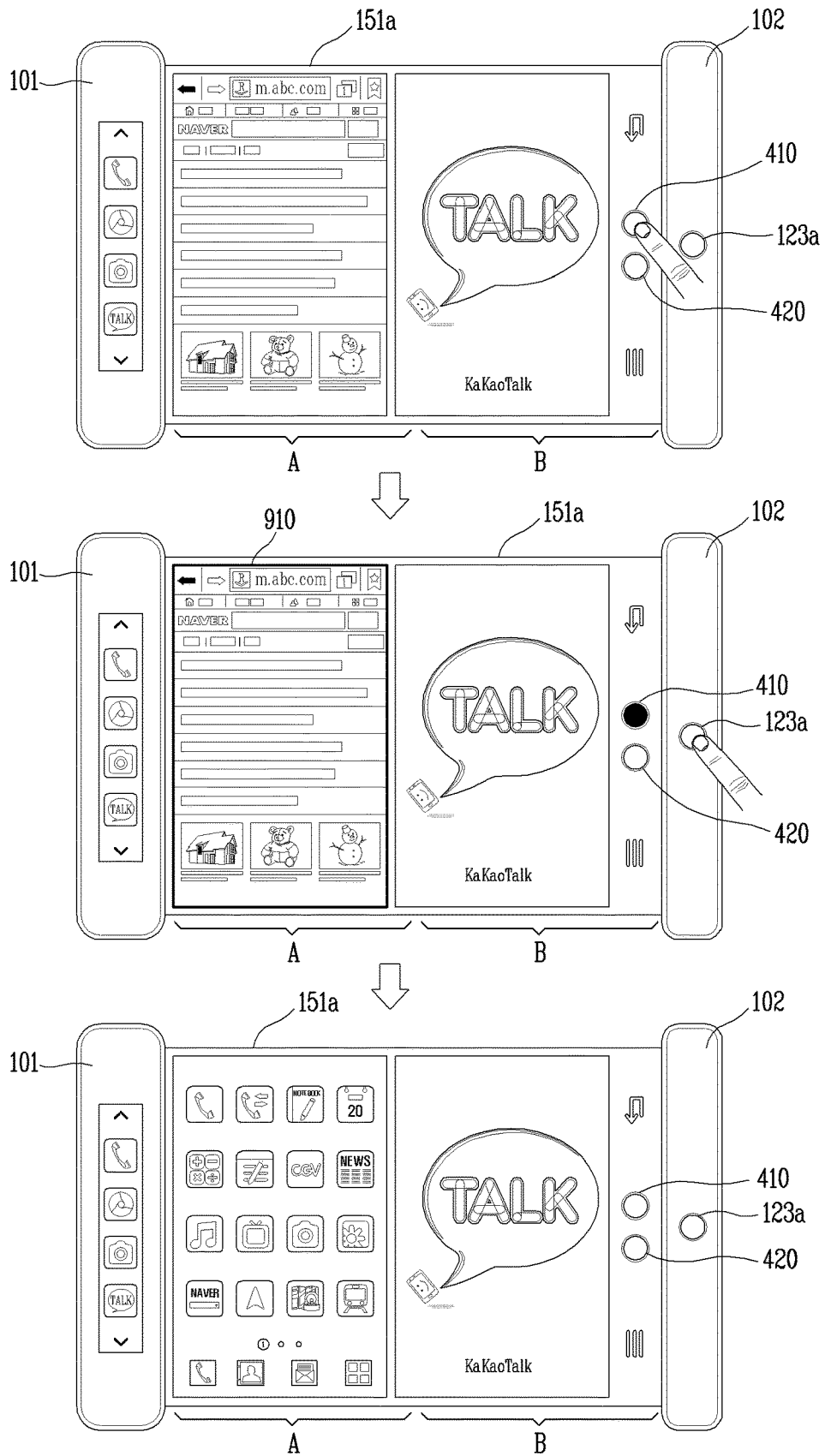
FIG. 9 is a conceptual view for explaining the operation of a rollable mobile terminal using a hardware-implemented home button and software-implemented virtual home buttons.

FIG. 9 is a conceptual view for explaining the operation of a rollable mobile terminal using a hardware-implemented home button and software-implemented virtual home buttons.

Referring to FIG. 9, the first user input unit 123a may be provided on at least one side of the first and second body units 101, 102 In this case, the first user input unit 123a may correspond to a home button implemented in hardware.

When a physical home button is provided on the rollable mobile terminal, the virtual home button may be used for the purpose of selecting a window.

The first and second windows (A, B) and the first and second virtual home buttons 410, 420 may be displayed in the display region. The controller 180 may select or release at least one of the first and second windows (A, B) based on a touch applied to at least one of the first and second virtual home buttons 410, 420.

For example, when a touch is applied to the first virtual home button 410 while the window is not selected, the first window (A) is selected. Although not shown in the drawing, when a touch is applied to the first and second virtual home buttons 410, 420 while the first window (A) is selected, the selection of the first window (A) is released, and the second window (B) is selected.

As at least one window is selected, at least one of the selected window and its corresponding virtual home button may be highlighted.

When the first user input unit 123a is pressed while at least one window is to selected, the controller 180 executes a function associated with the first user input unit 123a with respect to the selected window. For example, when the first user input unit 123a is pressed while the first window (A) is selected, the controller 180 may display a preset home screen page on the first window (A) while maintaining the display of the second window (B).

As the function associated with the home button is executed, selection for the selected window may be released. In other words, the selection may be reset.

Figure 10:
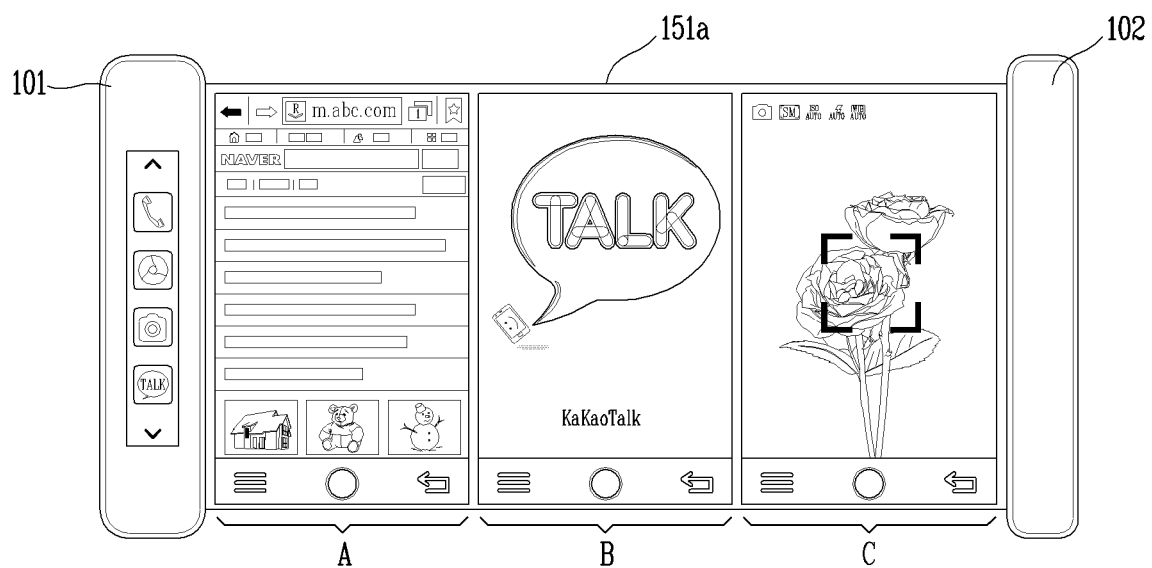
FIG. 10 is a conceptual view illustrating an example of displaying virtual home buttons corresponding to a plurality of windows, respectively.

FIG. 10 is a conceptual view illustrating an example of displaying virtual home buttons corresponding to a plurality of windows, respectively.

Referring to FIG. 10, a preset region corresponding to the relevant window may be included in each window. For example, when the first to third windows (A-C) are displayed in the display region, a total of three preset regions may be displayed in the display region. In other words, a first preset region may be included in the first window, a second preset region may be included in the second window, and a third preset region may be included in the third window.

FIGS. 11A through 11D are conceptual views for explaining an example of controlling a plurality of windows using one virtual home button.

The controller 180 may display a virtual home button to the display region when a touch input satisfying a preset condition is applied to the display region. This is to prevent information displayed in the display region from being covered by the virtual home button, and to allow the display region to be used as a large screen.

For example, a touch input satisfying the preset condition may be a drag input that starts from a region adjacent to the first body 101 or the second body 102 and moves over a predetermined distance. However, the touch input satisfying the preset condition may be modified in various ways according to the embodiment.

Figure 11A:
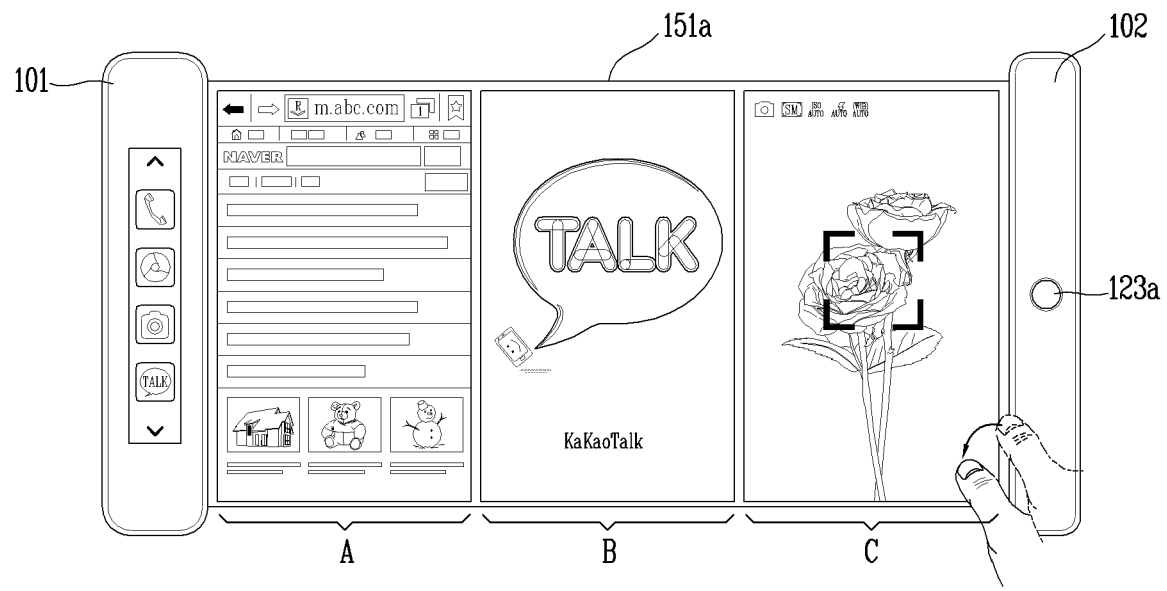
FIGS. 11A through 11D are conceptual views for explaining an example of controlling a plurality of windows using one virtual home button.
Figure 11A:
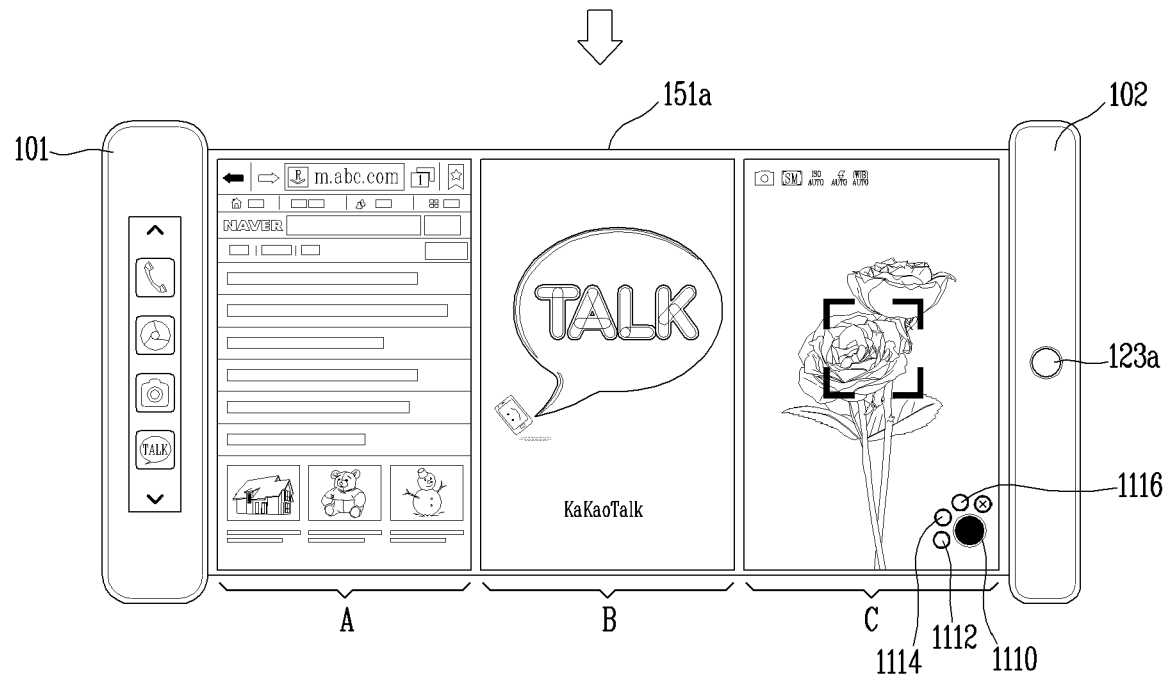

As illustrated in FIG. 11A, the controller 180 displays a virtual home button corresponding to each of the windows included in the display region in the display region in response to a touch input satisfying the preset condition.

In this case, the virtual home button may include one main home button 1110 and a plurality of sub-home buttons 1112-1116. The main home button 1110 is a virtual button for executing a function associated with the virtual home button, and the sub-home buttons 1112-1116 are virtual buttons for selecting at least one of a plurality of windows included in the display region.

Figure 11B:
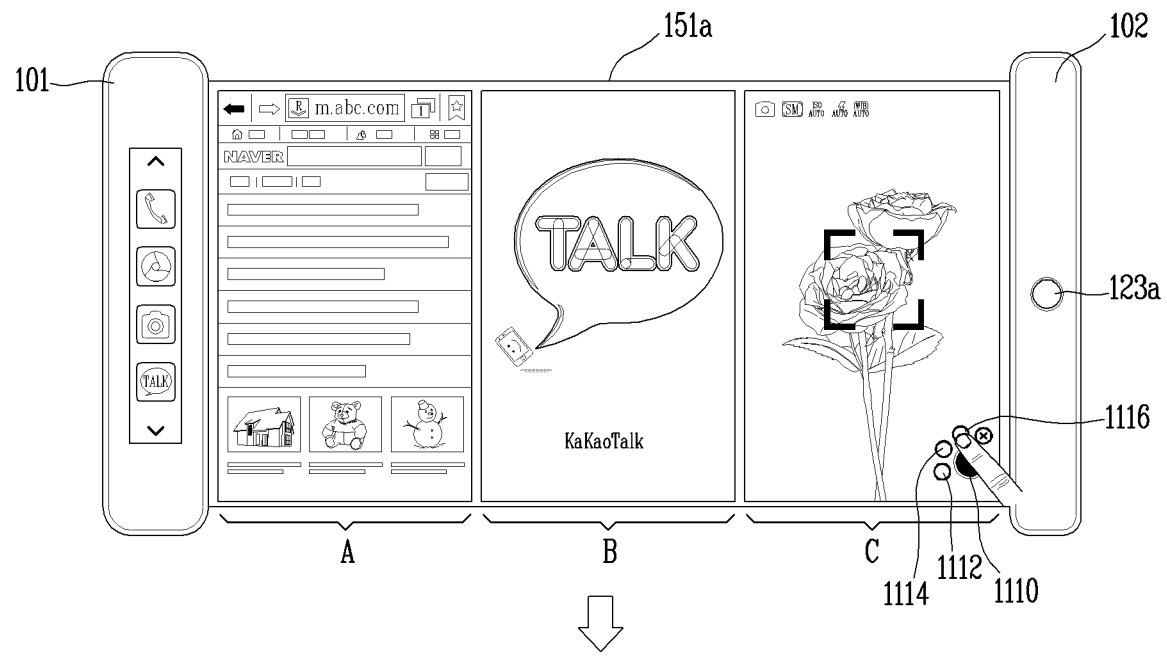
Figure 11B:
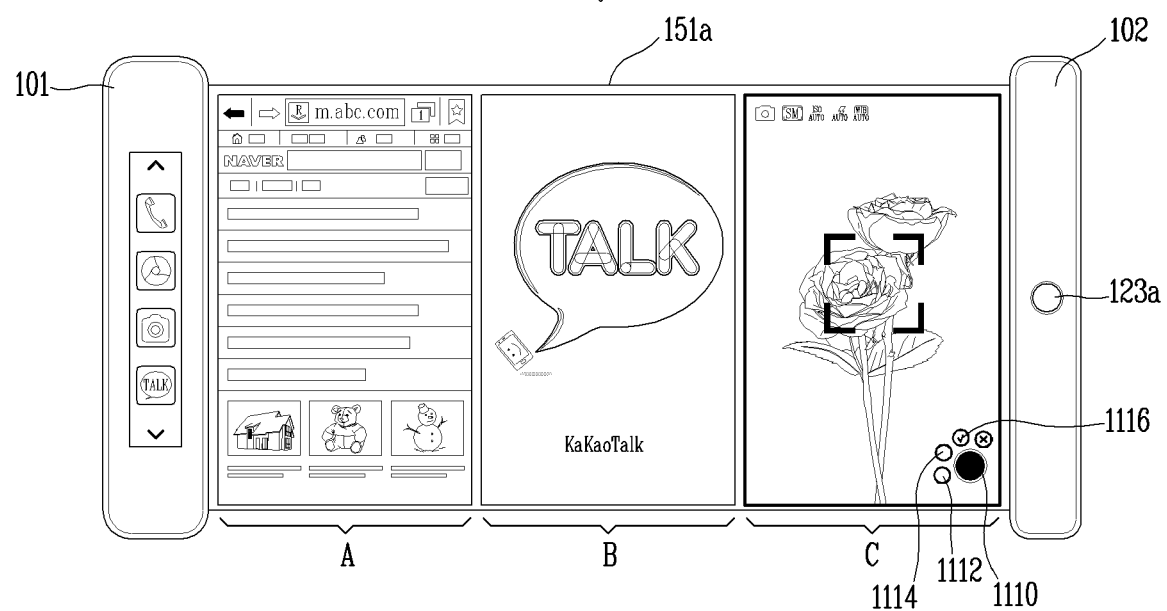

For an example, referring to FIG. 11B, a third sub-home button 1116 is used to select or deselect the third window (C).

When a touch is applied to the third sub-home button 1116, the controller 180 selects the third window (C). At least one of the third window (B) and the third sub-home button 1116 is highlighted to guide that the third window (B) is selected as the third window (C) is selected.

On the contrary, when a touch is applied to the third sub-home button 1116 while the third window (C) is selected, the selection of the third window (C) is released.

When a preset type of touch input is applied to the main home button 1110 while at least one window is selected, a different function is executed on the selected window depending on the type of the applied touch input.

Figure 11C:
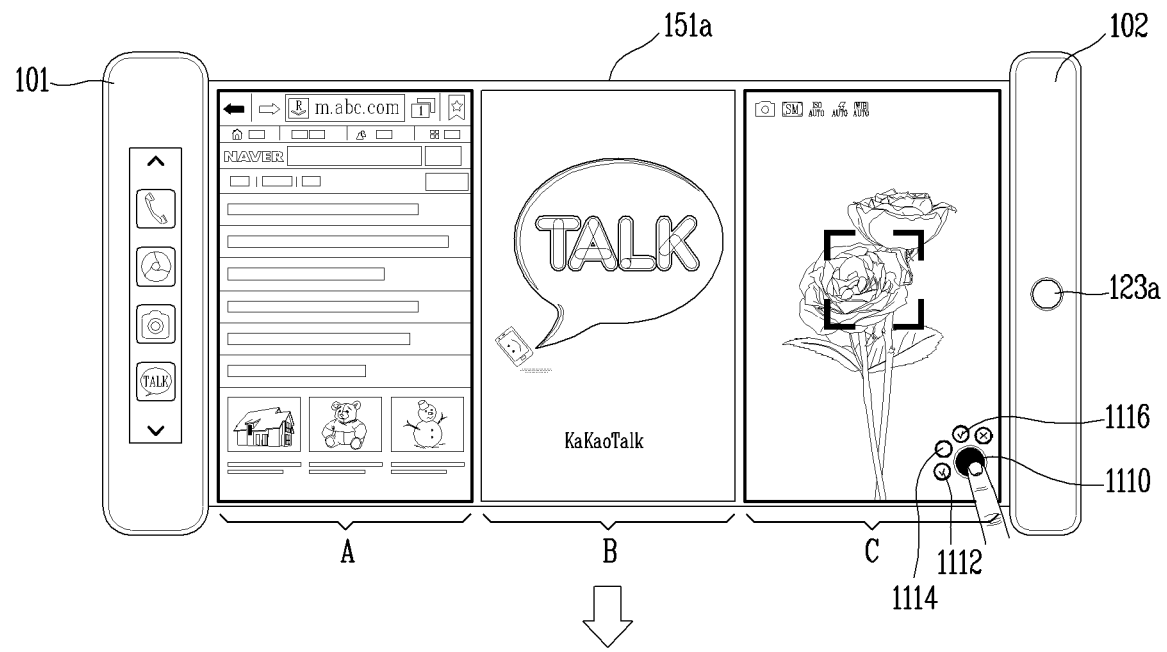
Figure 11C:
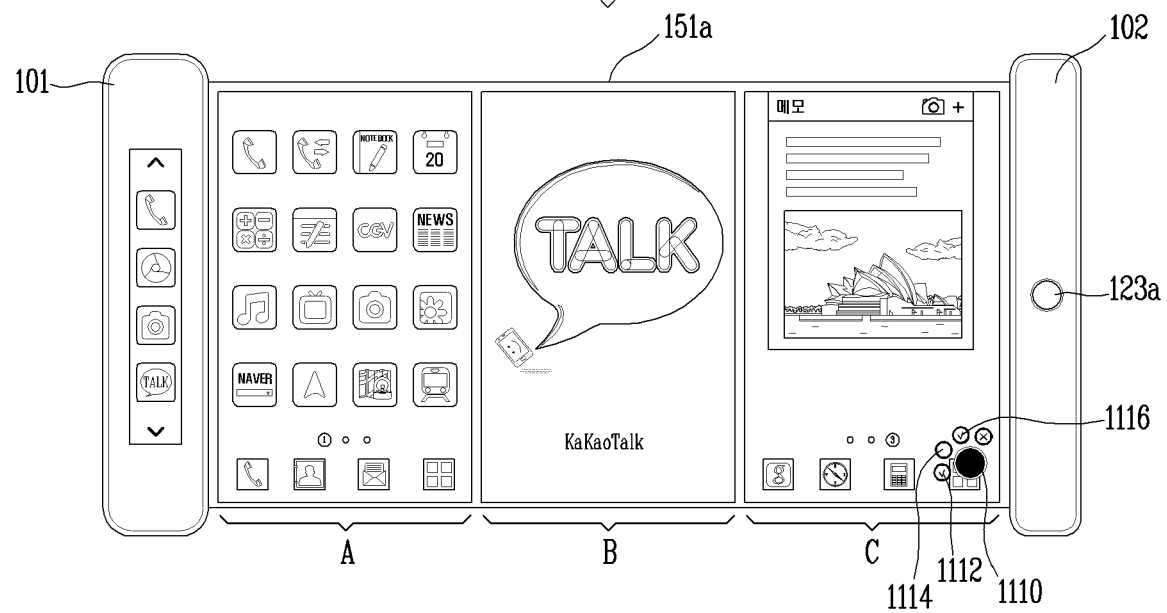

For example, as illustrated in FIG. 11C, when a first type of touch input is applied to the main home button 1110 while the first and third windows (A, C) are selected, a preset home screen page may be displayed on in the firsts and third windows (A, C). When a home screen page is composed of three pages in total, a first page may be displayed on the first window (A), and a third page may be displayed on the third window (C).

For another example, when a preset second type of touch input is applied to the main home button 1110 while the first and third windows (A, C) are selected, a list of recently executed apps may be displayed on the first and third windows (A, C). In this case, a list of apps whose execution screens have recently been displayed on the first window (A) may be displayed on the first window (A), and a list of apps whose execution screens have recently been displayed on the third window (C) may be displayed on the third window (C) In other words, a list of recently executed apps may be displayed in a different way for each window.

Meanwhile, when a user input unit is pressed while a touch is applied to the virtual home button, the controller 180 may capture at least a part of the screen being displayed in the display region to generate a capture image.

When a plurality of windows are displayed in the display region, at least one of the windows may be captured. More specifically, the plurality of windows are divided into windows selected by the user and windows not selected by the user, and only the selected window is captured.

Figure 11D:
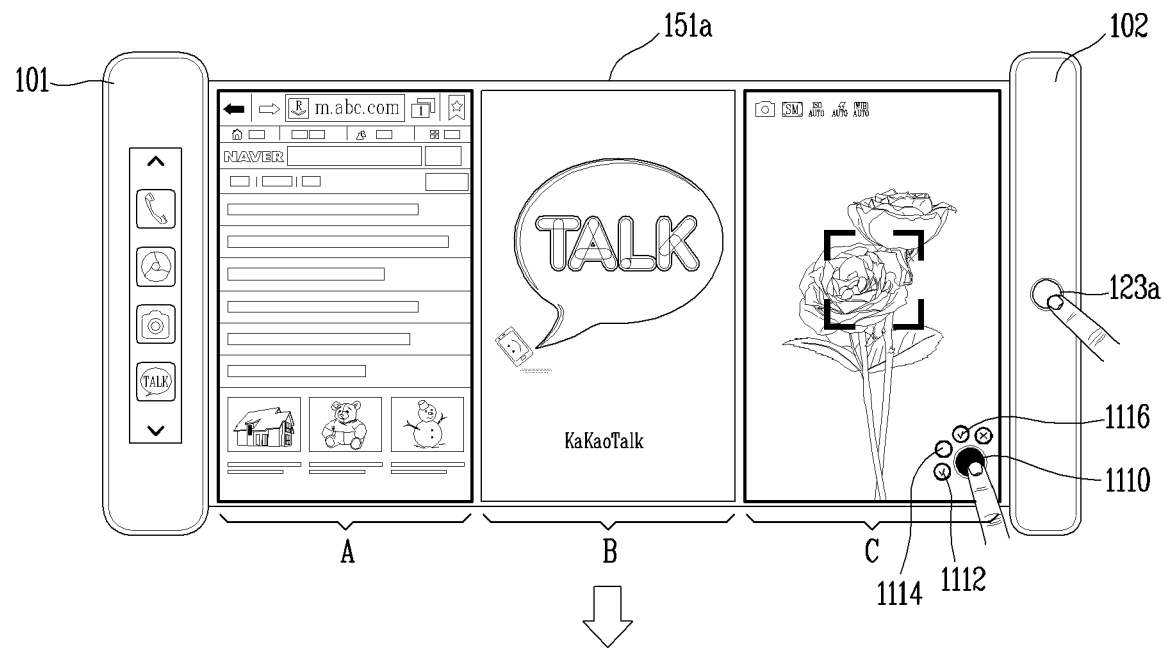
Figure 11D:
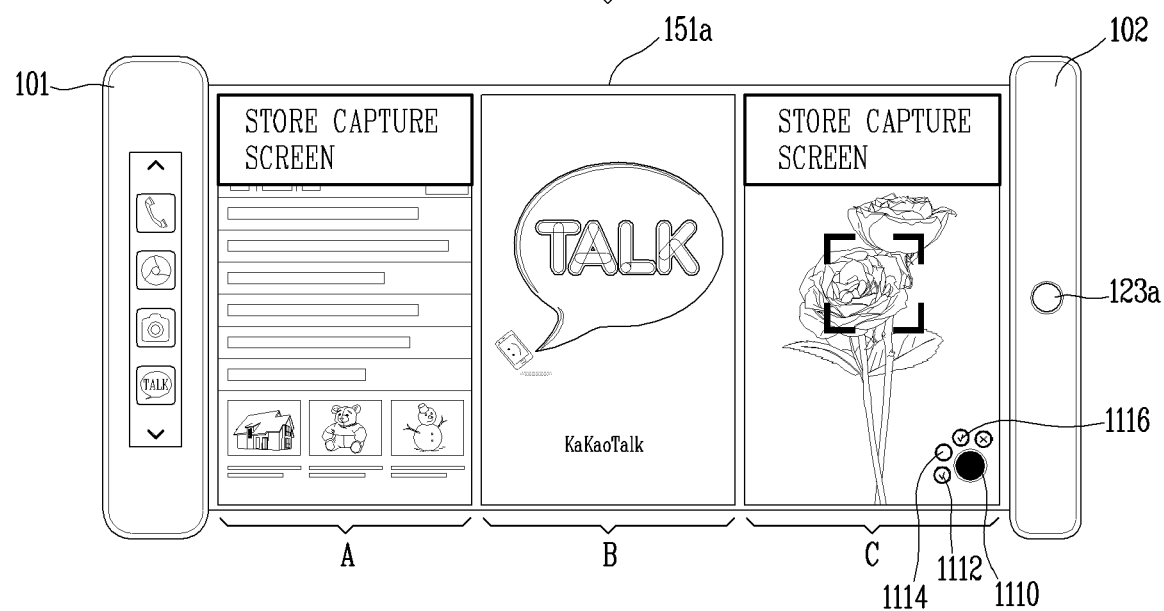

For example, as illustrated in FIG. 11D, when the first user input unit 123a is pressed while a touch is applied to the main home button 1110 in a state where the first and third windows (A, C) are selected, the first and third windows (A, C) are captured. In this case, at least one of a first capture image for the first window (A), a second capture image for the third window (C), and a third capture image for the first and third windows (A, C) may be generated and stored in the memory 170 (see FIG. 1).

Moreover, an indicator X is generated along with the virtual home button. When the indicator X is touched, the display for the virtual home button is ended. In other words, the virtual home button may be displayed in the display region or disappear from the display region according to a user input.

Figure 12A:
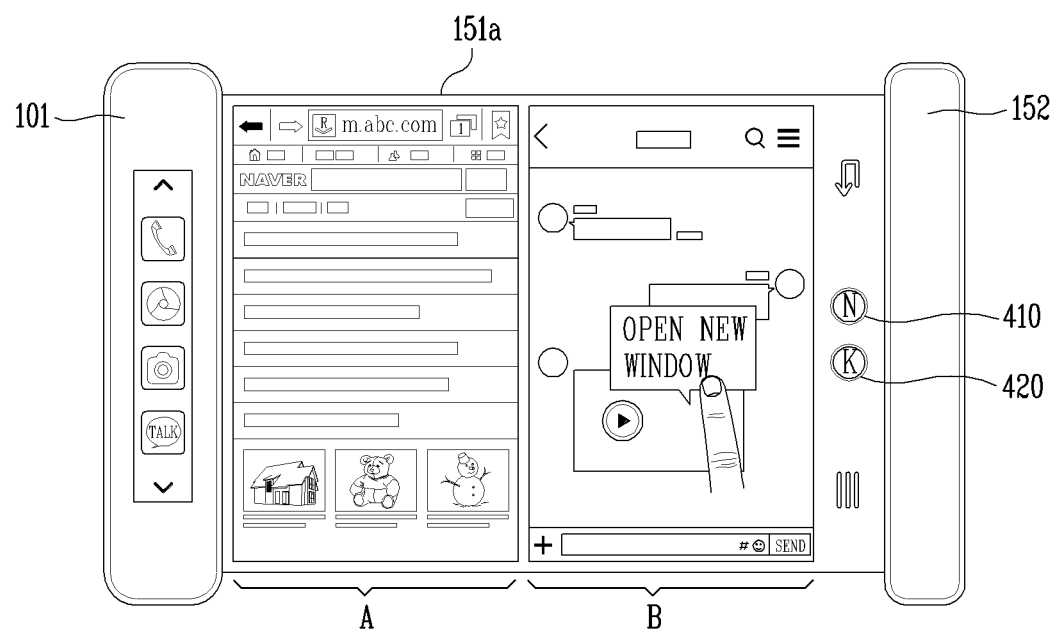
FIGS. 12A and 12B are conceptual views for explaining the operation of a rollable mobile terminal according to an embodiment of the present disclosure.
Figure 12A:
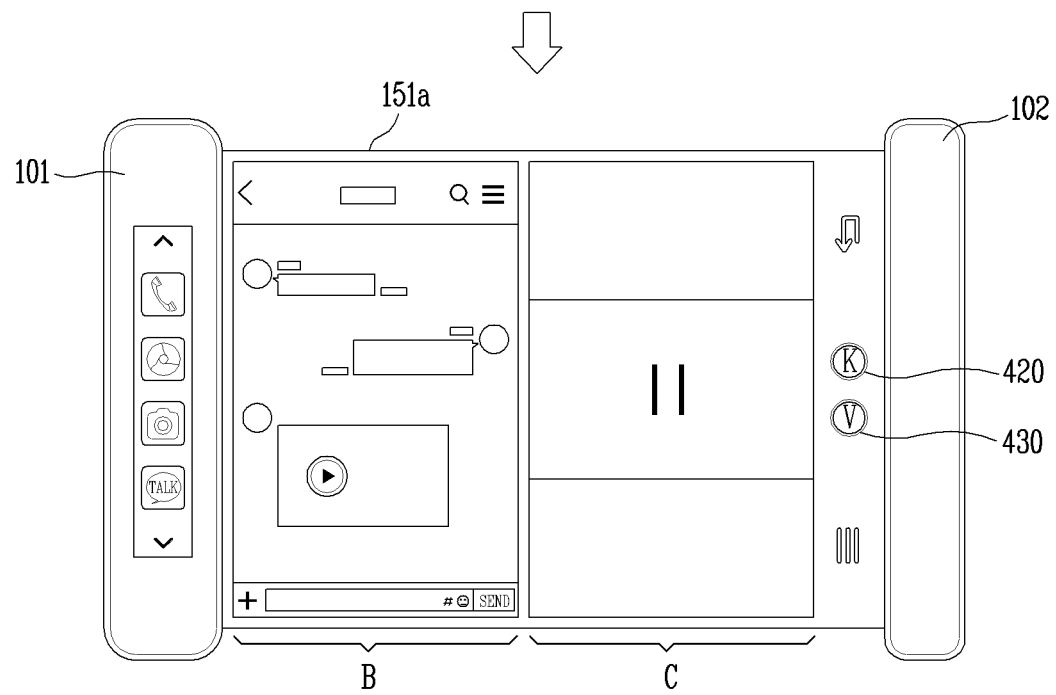
Figure 12B:
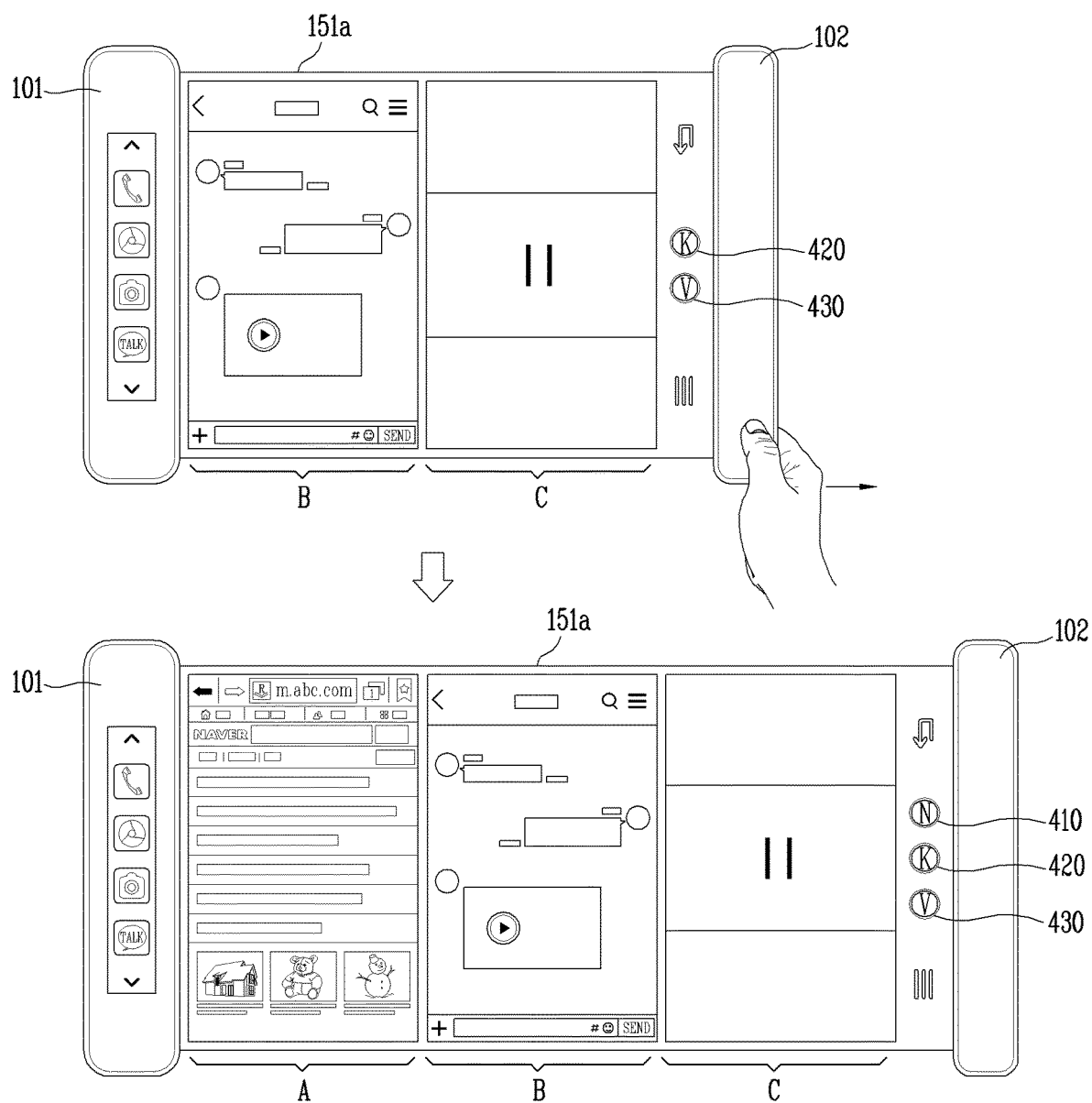

FIGS. 12A and 12B are conceptual views for explaining the operation of a rollable mobile terminal according to an embodiment of the present disclosure.

Referring to FIG. 12A, the first and second windows (A, B) and a preset region may be displayed in the display region. An execution screen of the first application is displayed on the first window (A), and an execution screen of the second application is displayed on the second window (B). For example, the first application may be a "NAVER browser" and the second application may be a "KAKAO messenger."

The preset region includes first and second virtual home buttons 410, 420, and information on an application displayed in each window may be displayed on the first and second virtual home buttons 410, 420. For example, "N" taken from the first letter of "NAVER browser" may be displayed on the first virtual home button 410, and "K" taken from the first letter of "KAKAO browser" may be displayed on the second virtual home button 420.

When a new window open function is executed by a user input, a new window may be displayed in the display region. For example, as illustrated in FIG. 12A, a third window (C) may be displayed, and information linked to the link may be displayed on the third window (C). When information linked to the link is "video content," a screen for playing the video content may be included in the third window (C).

As the third window (C) is displayed in the display region, the first window (A) disappears from the display region and the second window (B) may be displayed at a position where the first window (A) has been displayed.

In this case, the preset region includes a virtual home button corresponding to a window included in the display region, but does not include a virtual home button corresponding to a window not included in the display region.

For example, as illustrated in FIG. 12A, when the first window (A) disappears and the second and third windows (B, C) are displayed in the display region, the first virtual home button 410 disappears, but the second and third virtual home buttons 420, 430 may be displayed in the preset region. "V" taken from the first letter of "video content" may be displayed on the virtual home button 430.

Meanwhile, as a new window open function is executed, a user need to redisplay the first window (A) may occur while the first window (A) disappears from the display region.

In this case, the user may extend the display region using roll-out to redisplay the first window (A), which has recently displayed in the display region, in the display region.

More specifically, when roll-out occurs while displaying the second and third windows (B, C) and the second and third virtual home buttons 420, 430, the display region is gradually extended as the roll-out occurs. The controller 180 displays the first window (A) that has been recently displayed in the gradually extended region. As illustrated in FIG. 12B, the first to third windows (A-C) are displayed in the display region, and the first virtual home button 410 corresponding to the first window (A) is displayed again.

As described above, according to the present disclosure, one or more windows may be displayed in response to a variation of the display region, and one or more virtual home buttons for controlling the windows may be displayed in the rollable mobile terminal. A plurality of windows may be displayed in the mobile terminal and individually controlled using the virtual home button, thereby providing a new type of user convenience.

The configurations and methods according to the above-described embodiments will not be applicable in a limited way to the foregoing rollable mobile terminal, and all or part of each embodiment may be selectively combined and configured to make various modifications thereto.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A rollable mobile terminal, comprising:
a touch screen formed to be rollable;
a first body connected to one end of the touch screen to wind and accommodate the touch screen;
a second body connected to the other end of the touch screen; and
a controller configured to set at least one region of the entire region of the touch screen that is exposed outside the first body as a display region, and display a plurality of virtual home buttons corresponding to a plurality of windows in the display region when the plurality of windows comprising different screen information are displayed in the display region,
wherein when the display region is smaller than a reference size due to an external force while the first and second windows are displayed, the controller controls the touch screen to allow either one of the first and second windows and a virtual home button corresponding to the either one to disappear from the display region.

2. The rollable mobile terminal of claim 1, wherein when the plurality of windows comprises first and second windows, the controller displays a first virtual home button corresponding to the first window and a second virtual home button corresponding to the second window in the display region.

3. The rollable mobile terminal of claim 2, wherein the controller senses a control command related to information displayed on the first window using a touch input applied to the first virtual home button, and senses a control command related to information displayed on the second window using a touch input applied to the second virtual home button.

4. The rollable mobile terminal of claim 3, wherein when a preset first type of touch input is applied to the first virtual home button while an execution screen of a first application is displayed on the first window and an execution screen of a second application is displayed on the second window, the controller displays a home screen page on the first window instead of the execution screen of the first application.

5. The rollable mobile terminal of claim 4, wherein when the preset first type of touch input is applied to the second virtual home button, the controller displays a home screen page on the second window instead of the execution screen of the second application.

6. The rollable mobile terminal of claim 5, wherein when a home screen page comprises a plurality of pages, a home screen page displayed on the first window is a first page among the plurality of pages, and a home screen page displayed on the second window is a second page among the plurality of pages.

7. The rollable mobile terminal of claim 2, wherein the first and second virtual home buttons are sequentially displayed along a longitudinal direction of the second body in a region adjacent to the second body in the display region.

8. The rollable mobile terminal of claim 7, wherein when a drag input is applied to either one of the first and second virtual home buttons, a window corresponding to the either one is processed differently according to a point from which the drag input is released.

9. The rollable mobile terminal of claim 8, wherein when the display positions of the first and second virtual home buttons are changed by the drag input, the display positions of the first and second windows are changed with each other.

10. The rollable mobile terminal of claim 8, wherein when the drag input is released from an edge of the touch screen, the controller controls the touch screen to allow the either one and a window corresponding to the either one to disappear.

11. The rollable mobile terminal of claim 7, wherein when an execution screen of a first application is displayed on the first window and an execution screen of a second application is displayed on the second window, information related to the first application is displayed on the first virtual home button, and information related to the second application is displayed on the second virtual home button.

12. The rollable mobile terminal of claim 2, wherein when the display region is extended by an external force while the first and second windows are displayed, the controller displays the first and second windows, and a third window, and displays the first and second virtual home buttons, and a third virtual home button corresponding to the third window in the extended display region.

13. The rollable mobile terminal of claim 1, wherein the first window is displayed adjacent to the first body in the display region, and the second window is displayed adjacent to the second body in the display region, and
the controller controls the touch screen to allow the second window and the second virtual home button to disappear from the display region when the display region is smaller than the reference size due to a movement of the second body while the first body is fixed, and controls the touch screen the touch screen to allow the first window and the first virtual home button to disappear from the display region when the display region is smaller than the reference size due to a movement of the first body while the second body is fixed.

14. The rollable mobile terminal of claim 1, further comprising:
a sensing unit configured to sense at least one region of the entire region of the touch screen that is exposed outside the first body unit,
wherein the controller sets the sensed at least one region as the display region.

15. A rollable mobile terminal, comprising:
a touch screen formed to be rollable;
a first body connected to one end of the touch screen to wind and accommodate the touch screen;

a second body connected to the other end of the touch screen; and a controller configured to set at least one region of the entire region of the touch screen that is exposed outside the first body as a display region, and control the touch screen to display an execution screen of a first application in the display region, wherein when an event occurs in a second application while displaying an execution screen of the first application, the controller displays guide information for notifying the event on the display region, and when the display region is extended by an external force while displaying the guide information, the controller displays an execution screen of the first application in a first region of the extended display region, and displays an execution screen of the second application in a second region of the extended display region, and displays a first virtual home button for the execution screen of the first application and a second virtual home button for the execution screen of the second application in the extended display region.

16. The rollable mobile terminal of claim 15, wherein when a new window open function is executed for a link included in the execution screen of the second application, the controller controls the touch screen to display information linked to the link in the second region, and display the execution screen of the second application in the first region, and allow the execution screen of the first application to disappear from the display region.

17. The rollable mobile terminal of claim 16, wherein the first virtual home button, the second virtual home button, and a third virtual home button for information linked to the link are displayed on the display region when the new window open function is executed.

18. The rollable mobile terminal of claim 17, wherein the first virtual home button is displayed to be distinguished from the second and third virtual home buttons to guide that the execution screen of the first application is not displayed in the display region.

19. The rollable mobile terminal of claim 18, wherein when a drag-and-drop input to any one of the first through third virtual home buttons is sensed, the controller controls the touch screen to display any one of an execution screen of the first application, an execution screen of the second application, and information linked to the link in the first region, and to display another one in the second region, and not to display the remaining one on the display region based on the drag-and-drop input, and a virtual home button corresponding to the remaining one is displayed to be distinguished from other virtual home buttons to guide that the remaining one is not displayed in the display region.

* * * * *